(12) United States Patent
Dumesny et al.

(10) Patent No.: US 7,148,899 B2
(45) Date of Patent: Dec. 12, 2006

(54) TEXTURE MAPPING 3D OBJECTS

(75) Inventors: Alain M. Dumesny, Mountain View, CA (US); Christopher L. Fouts, Suwanee, GA (US)

(73) Assignee: Computer Associates Think, Inc., Islandia, NY (US)

( * ) Notice: Subject to any disclaimer, the term of this patent is extended or adjusted under 35 U.S.C. 154(b) by 0 days.

(21) Appl. No.: 11/227,779

(22) Filed: Sep. 14, 2005

(65) Prior Publication Data

US 2006/0087505 A1    Apr. 27, 2006

Related U.S. Application Data

(63) Continuation of application No. 08/903,440, filed on Jul. 30, 1997, now abandoned.

(51) Int. Cl.
*G09G 5/00* (2006.01)
(52) U.S. Cl. ...................................... 345/582; 345/419
(58) Field of Classification Search ................... None
See application file for complete search history.

(56) References Cited

U.S. PATENT DOCUMENTS

| | | | |
|---|---|---|---|
| 4,334,245 A | 6/1982 | Michael | 348/581 |
| 4,437,121 A | 3/1984 | Taylor et al. | 348/583 |
| 4,688,181 A | 8/1987 | Cottrell et al. | 345/433 |
| 5,230,039 A | 7/1993 | Grossman et al. | 345/430 |
| 5,255,352 A | 10/1993 | Falk | 345/425 |
| 5,333,245 A | 7/1994 | Vecchione | 345/430 |
| 5,396,590 A | 3/1995 | Kreegar | 345/436 |
| 5,412,765 A | 5/1995 | Yamrom et al. | 345/430 |
| 5,448,687 A | 9/1995 | Hoogerhyde et al. | 345/425 |
| 5,469,535 A | 11/1995 | Jarvis et al. | 395/130 |
| 5,544,292 A | 8/1996 | Winser | 345/430 |
| 5,550,960 A | 8/1996 | Shirman et al. | 395/130 |
| 5,606,650 A | 2/1997 | Kelley et al. | 395/130 |
| 5,630,043 A | 5/1997 | Uhlin | 395/174 |
| 5,764,237 A | 6/1998 | Kaneko | 345/552 |
| 5,973,701 A | 10/1999 | Vaswani | 345/587 |
| 6,002,410 A | 12/1999 | Battle | 345/513 |
| 6,037,948 A | 3/2000 | Liepa | 345/582 |
| 6,348,917 B1 | 2/2002 | Vaswani | 345/418 |
| 6,683,606 B1 | 1/2004 | Yamamoto et al. | 345/419 |

OTHER PUBLICATIONS

GamGen II (http://www.miltigen.com/prodist/mgproducts/ggii/page1-4.htm); author and publication date unknown.

Alias Wavefront 3 Design "The Smart Modeler" A Silicon Graphics Company (http://www.aw.sgi.com/pages/home/pages/products/pages/3design_sgi_index.html); author and publication date unknown.

*Primary Examiner*—Mark Zimmerman
*Assistant Examiner*—Enrique L. Santiago
(74) *Attorney, Agent, or Firm*—Baker Botts L.L.P.

(57) ABSTRACT

A texture is applied to a 3D graphic object using a computer system by providing a graphic indication of a mapping between a 3D graphic object and a texture map and modifying the mapping based on a manipulation of the graphic indication. Alternatively, or in addition, a texture can be applied to a 3D graphic object by selectively applying one or more predetermined mapping functions between a texture space and an object space to designated portions of the 3D graphic object. The modification of mappings, and application of the mapping functions, can be based on input received from a user of the computer system, for example, by means of direct manipulation techniques applied in a graphical user interface.

51 Claims, 35 Drawing Sheets
(35 of 35 Drawing Sheet(s) Filed in Color)

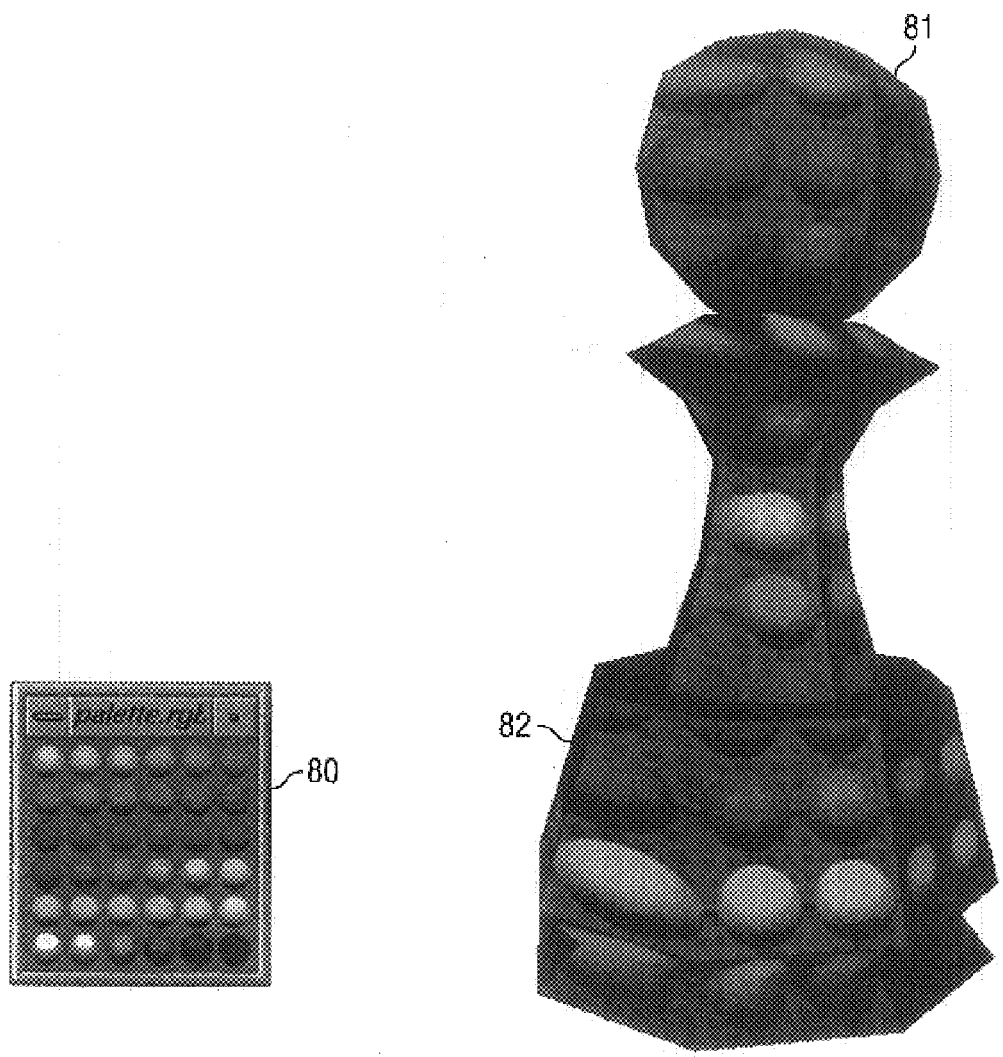
*FIG. 8A*  *FIG. 8B*

TEXTURE MAPPING 3D OBJECTS

RELATED APPLICATIONS

This application is a continuation of U.S. application Ser. No. 08/903,440, filed Jun. 30, 1997 now abandoned, entitled "Texture Mapping 3D Graphic Objects.

BACKGROUND

This invention relates to mapping textures onto 3D graphic objects.

The computer system illustrated in FIG. 1—which includes mouse 15, keyboard 16, CPU 17 and CRT 18—represents a hardware setup for running software that allows a user to model and/or render 3D graphic objects. Modeling and rendering of 3D graphic objects are used, for example, to generate 3D virtual scenes on the display screen of a computer system. The surface topology of a 3D object can be modeled as a set of polygons of appropriate sizes and shapes joined at their edges. The set of polygons defining the 3D object, referred to as the "model" for the 3D object, is represented by a collection of coordinates residing in a logical space (referred to as the "object space") defined by a set of three axes, x, y and z. If the 3D object is to be displayed in wire-frame form, only the edge lines that form the polygons in the model are rendered, thus generating a skeleton-like image of the object. For example, the model of an X-29 aircraft shown in FIG. 2A consists of several hundred unfilled polygons joined together at their edges to form a wire-frame representation of the aircraft.

A more realistic rendering of the 3D object can be achieved by shading the polygons with various colors as appropriate, for example, as shown in FIG. 2B, by taking into account lighting and surface properties of the 3D object under consideration. The degree of realism or detail can be enhanced further by adding a texture to the surface of the 3D object. FIGS. 3A–3H show four different examples of before and after views of various surface textures being applied to four different 3D objects—a cube (FIGS. 3A–3B), a cylinder (FIGS. 3C–3D), a sphere (FIGS. 3E–3F) and a cone (FIGS. 3G–3H).

Applying a surface texture to a 3D object is referred to as "texture mapping" in which an image or "texture map"—a 2D array of pixel information, such as the map of Earth shown in FIG. 4—is overlaid on a 3D object's surface typically in a repeating manner, roughly similar to laying tiles on a floor. Alternatively, the texture can be stretched to cover the surface under consideration. A texture map resides in its own logical space (referred to as the "texture space") defined by a pair of axes s and t as shown in FIG. 4. The texture space is independent of an object space in which the surface topology of a 3D object is defined.

A texture is mapped onto a 3D object by creating a mapping, or correlation, between coordinates in the object space and coordinates in the texture space. Different mapping functions can be used to apply a texture to a 3D object depending on the object designer's preferences. Many of the various different "primitives" (fundamental surface topologies) each has an associated standard mapping function. As shown in FIG. 5A, for example, the standard texture mapping function for a cube is to apply the entire texture map to each face of the cube. The standard mapping function for a cylinder is to apply the texture map to each end face of the cylinder and to wrap one instance of the entire texture map around the cylinder's circumference, as shown in FIG. 5B. Standard texture mapping functions also exist for a sphere (FIG. 5C) and a cone (FIG. 5D).

For non-primitive objects (e.g., objects having arbitrary surface topologies such as the bust of the female head shown in FIG. 6A), a standard plane mapping function typically is used to apply a texture to the surface of a 3D object. First, the 3D object's bounding box (i.e., a logical 3D box that is just big enough to encompass the 3D object) is calculated and then texture (for example, the texture map shown in FIG. 6B) is mapped to the largest face of the bounding box. In effect, plane mapping is accomplished by projecting the texture through the 3D graphic object, analogous to projecting an image from a slide projector onto a 3D physical object, as shown in FIG. 6C. These and other texture mapping techniques are discussed in Josie Wernecke, *The Inventor Mentor: Programming Object-Oriented 3D Graphics with Open Inventor, Release* 2, chapter 7, Addison-Wesley (1994), which is incorporated by reference.

Users can designate a texture to be applied to a 3D object by using an interactive graphical user interface (GUI) utility such as that shown in FIG. 7. The utility includes a Texture Mapper window 70 having a preview region 72 in which a preview version of the 3D object 71 being texture-mapped is displayed. A user designates a new or different texture for the 3D object by clicking the cursor on one of several different texture choices displayed in a texture palette 73. In response, a preview version of the object 71 with the selected texture applied is displayed in the preview window 72 to give the user an indication of how the texture mapped object will appear when rendered at a full level of detail.

A texture mapping utility may provide other features that allow a user to specify certain aspects of the manner in which a texture is mapped to the 3D object. Such features may allow the user to translate the texture map relative to the 3D object, to select among repeating and stretching type mapping functions, or to specify a texture repetition interval.

SUMMARY

In one aspect, a texture is applied to a 3D graphic object using a computer system by providing a graphic indication of a mapping between a 3D graphic object and a texture map and modifying the mapping based on a manipulation of the graphic indication. Substantially at the same time as the modification of the mapping occurs, the 3D graphic object can be rendered based on the modified mapping. The modification of the mapping and the rendering of the 3D graphic object can occur in real time.

Prior to the modification of the mapping, user input specifying the manipulation of the graphic indication of the mapping may be received through a graphic user interface. This may include presenting a first display region representative of a texture space and at least one other display region representative of an object space. The texture map may be displayed in the first display region and the 3D graphic object may be displayed in the other display region. Provision of the graphic indication of the mapping may include displaying in the first display region a graphic element representative of the 3D graphic object at a location on the texture map corresponding to the mapping. Manipulation of the graphic indication may include performing a direct manipulation operation on the graphic element displayed in the first display region. The direct manipulation operation may include translating the graphic element to a new location on the texture map, scaling the graphic element relative to the texture map, rotating the graphic element relative to the texture map, or a combination thereof. Input may be received from a user specifying a point about which the scaling or rotating is to be performed. Visual feedback may be provided as the direct manipulation operation is being performed. Moreover, if the direct manipulation operation causes the graphic element to extend beyond a boundary of the texture map, an instance of the texture map may be repeated automatically.

Modification of the mapping may be accomplished by modifying a mapping between coordinates in an object space and coordinates in a texture space. The modification may involve altering only a portion of the mapping between the 3D graphic object and the texture map. The 3D graphic object can be modelled as a plurality of polygons defined by coordinates in the object space. Modification of the mapping can be based on input received from a user specifying one or more polygons for which the mapping is to be modified. A set of coordinates in the object space and a set of coordinates in the texture space may be selectively shared or not (e.g., based on user input) between adjacent polygons. Where coordinates are shared, modification of the mapping for a polygon also may modify the mapping for an adjacent polygon. Alternatively, modification of the mapping may alter the mapping for a polygon without altering the mapping for an adjacent polygon.

In another aspect, a texture is applied to a 3D graphic object using a computer system by providing a visual indication of a correlation between a 3D graphic object and a texture map and modifying the correlation by selectively applying a predetermined mapping function between a texture space and an object space to a portion of a 3D graphic object. Modification of the correlation may involve selectively applying one of several available predetermined mapping functions between a texture space and an object space to different portions of the 3D graphic object. User input may be received (e.g., through a graphical user interface) that specifies one of the predetermined mapping functions which is to be applied to the portion of the 3D graphic object. User input also may be received that specifies different portions of the 3D graphic object to which the specified mapping functions are to be applied.

In another aspect, a user interface for applying a texture to a 3D graphic object includes an object region displaying a 3D graphic object formed of polygons, a texture region displaying a texture map, and a marker (e.g., a graphic indication) within the texture region defining a mapping between a polygon of the 3D graphic object and the texture map. The marker may appear visually similar to a corresponding polygon forming the 3D graphic object. Movement of the marker within the texture map may cause a corresponding change in the mapping between the polygon of the 3D graphic object and the texture map. Several markers may be displayed within the texture region each of which defines a mapping between a corresponding polygon of the 3D graphic object and the texture map. In that case, one of the markers can be moved independently of the other markers. Movement of one of the markers selectively may or may not affect the mappings of adjacent markers.

Advantages of the texture mapping methods and techniques described here may include one or more of the following. The texture manipulation techniques and methods described here represent a rich and powerful set of tools with which texture mappings can be adjusted or fine tuned according to a user's preferences. As a result, users are able to generate highly realistic textures on 3D objects having an arbitrarily complex surface topologies. The texture manipulation tools are presented in an intuitive graphic user interface that allows users to modify texture mappings using direct manipulation techniques. Users are guided in their texture modifications through real time visual feedback. As a result, users can craft texture mappings to their liking through a few simple, fast and easy steps.

The texture manipulation tools provide a dramatic increase in the flexibility with which texture mappings can be modified. Users have the option of modifying a texture mapping for any individual polygon in the 3D object or for an arbitrary set of the object's polygons. The texture modification can be accomplished through any of three different types of operations (translating, scaling, rotating), further increasing the flexibility available to users. Moreover, by allowing users to specify whether or not texture coordinates are to be shared between adjacent object polygon's, users are given the option of modifying the texture mapping for an object polygon independently of the neighboring object polygons.

By enabling a user to apply various different standard texture mapping functions to designated portions of a 3D object, the user can correct texture mapping artifacts on the object's coarse features quickly and easily. As a result, the task of fine tuning the texture mappings for the 3D object's remaining features is simplified considerably.

Other advantages and features will become apparent from the following description, including the drawings and claims.

DESCRIPTION OF THE DRAWINGS

The patent or application file contains at least one drawing executed in color. Copies of this patent or patent application publication with color drawings will be provided by the U.S. Patent and Trademark Office upon request and payment of the necessary fee.

FIGS. 8A–8C show examples of artifacts that can arise when a texture is applied to a 3D object having an arbitrary surface topology.

DETAILED DESCRIPTION

Although standard texture mapping techniques have proven useful in creating renderings of textured 3D objects with varying degrees of realism, they are primarily intended for application to 3D object primitives or other simple surface topologies. When the standard techniques are applied to a 3D object having an arbitrarily complex surface topology surface artifacts and other flaws that mar the appearance of the textured object may appear.

Silicon Graphics Cosmo™ Worlds authoring environment provides a rich body of texture application and manipulation functionality that enables a user of a computer system to apply a texture and fine tune it until the object has the desired appearance. Even when textures are applied to 3D objects having arbitrarily complex surface topologies, Cosmos™ Worlds texture manipulation features enable users to make the object appear unflawed and realistic. Cosmo™ Worlds implements this and other functionality through intuitive visual manipulation tools that allow users to easily and directly manipulate texture mappings applied to 3D graphic objects. Among other features, these tools enable users to orient, align, position and size a texture map relative to a 3D graphic object and to apply different standard mapping functions to different portions of a single 3D graphic object. Online documentation, incorporated herein by reference, describing the operation and features of Cosmo™ Worlds may be accessed at the following location on the World Wide Web:

http://cosmo.sgi.com/worlds/support/CosmoWorlds_UG/

A copy of selected portions of the documentation is attached as Appendix A.

Figure 1:
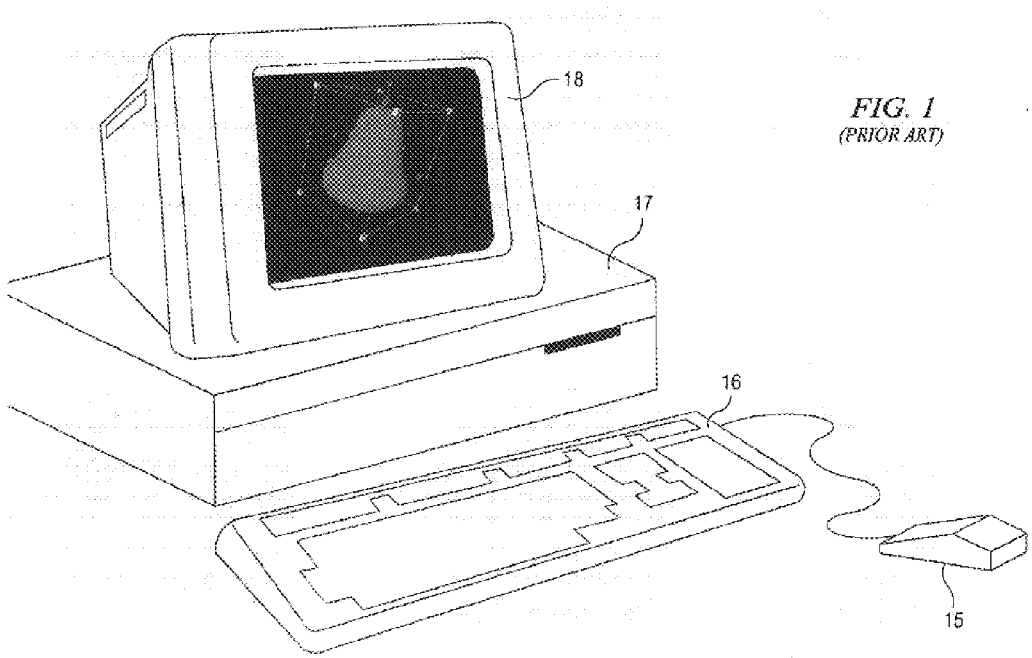
FIG. 1 shows a computer system displaying a 3D image.
Figure 2A:
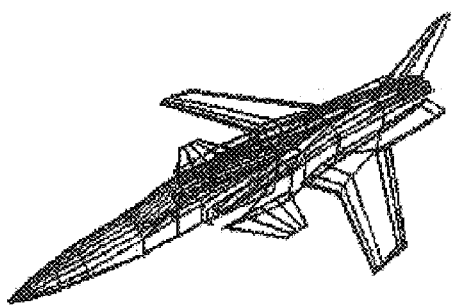
FIGS. 2A and 2B are views of an X-29 aircraft rendered in wire-frame and shaded representations, respectively.
Figure 2B:
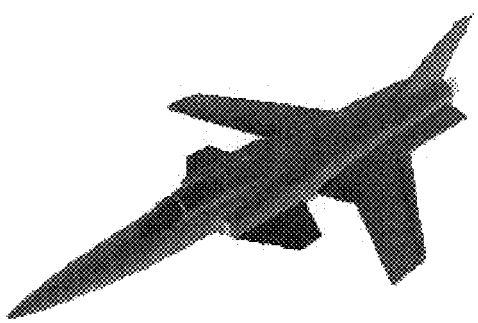
Figure 3A:
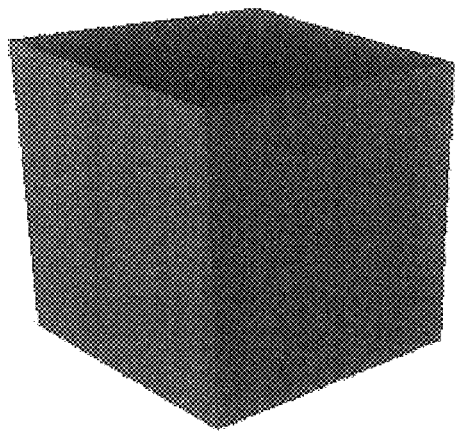
FIGS. 3A–3H show before and after views of four different example of applying a texture to the surface of a 3D graphic object.
Figure 3B:
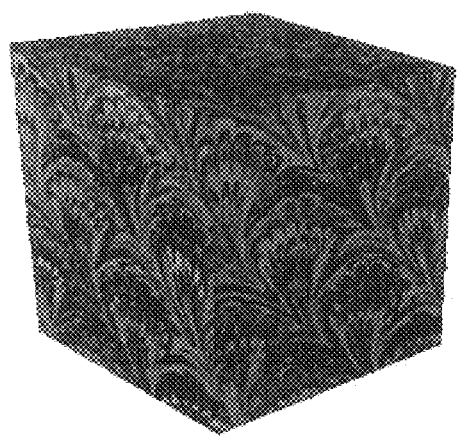
Figure 3C:
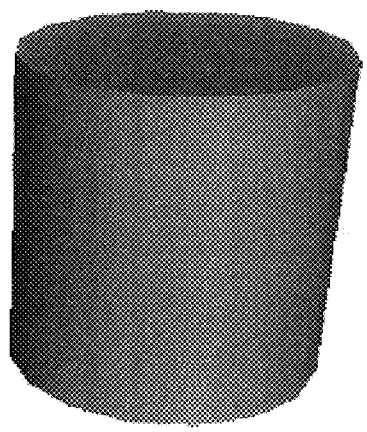
Figure 3D:
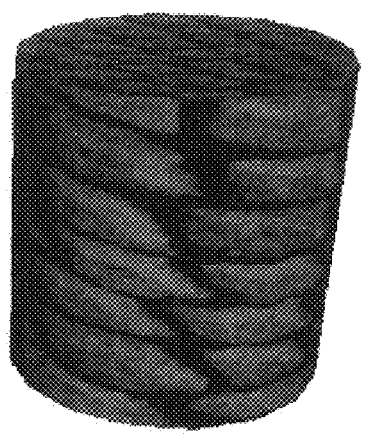
Figure 3E:
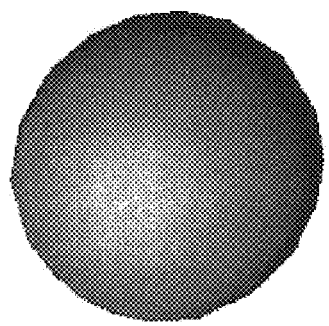
Figure 3F:
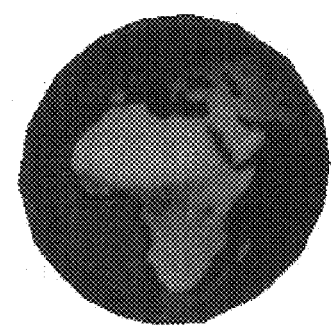
Figure 3G:
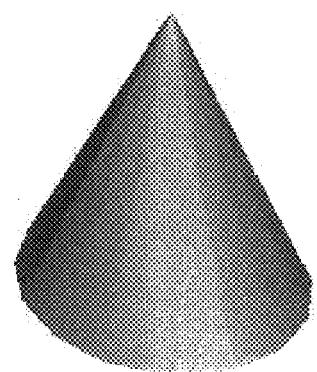
Figure 3H:
Figure 4:
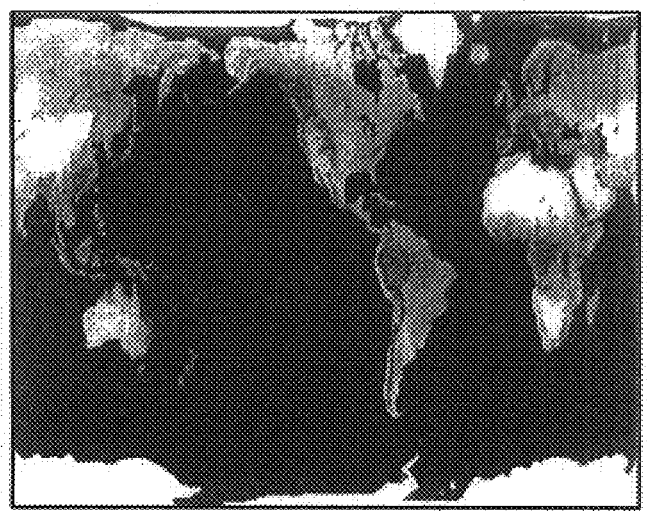
FIG. 4 is an example of a texture map.
Figure 5A:
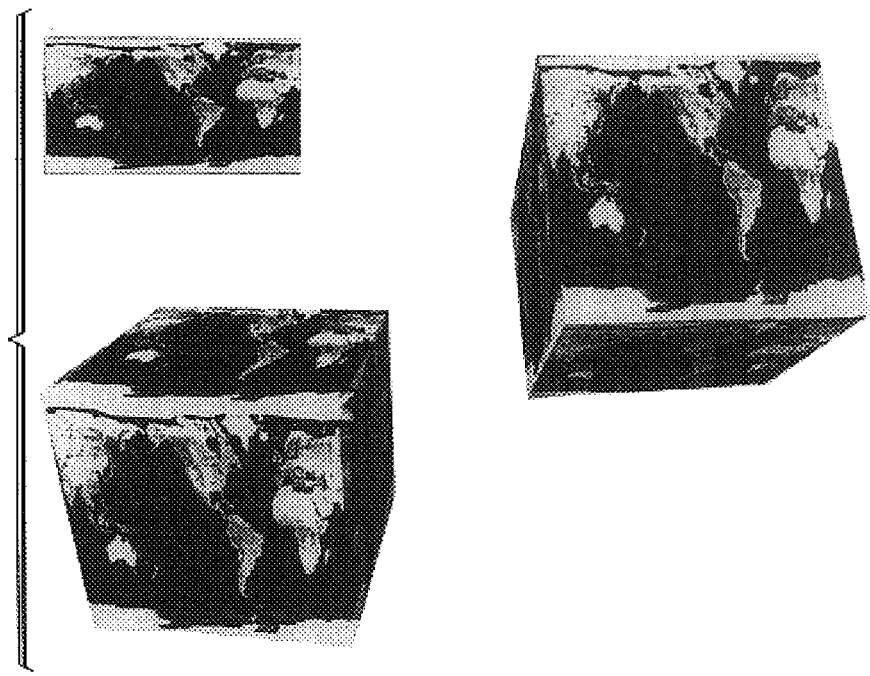
FIGS. 5A–5D illustrate the standard texture mapping functions for four different primitives.
Figure 5B:
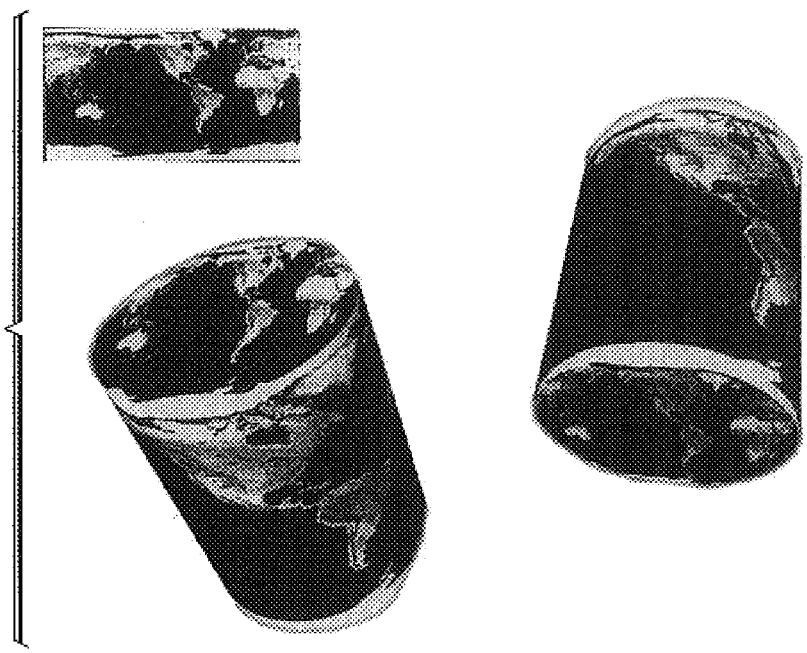
Figure 5C:
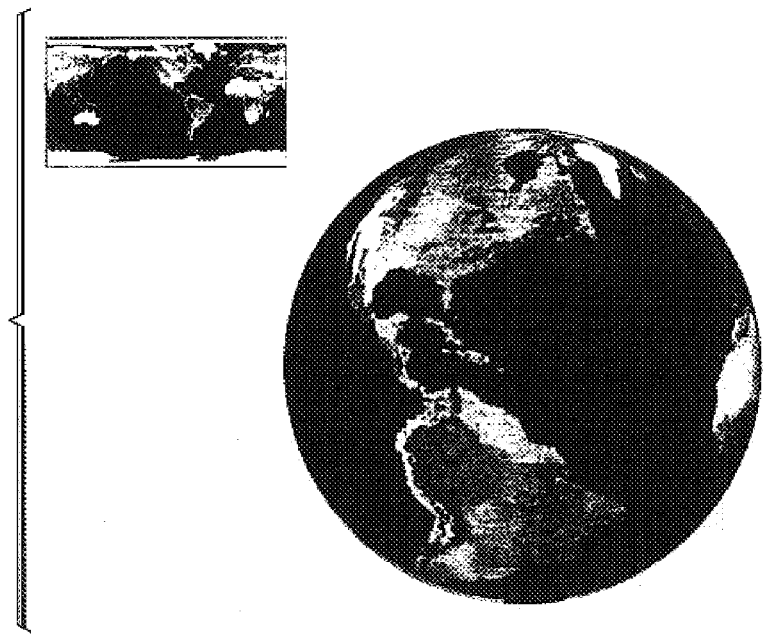
Figure 5D:
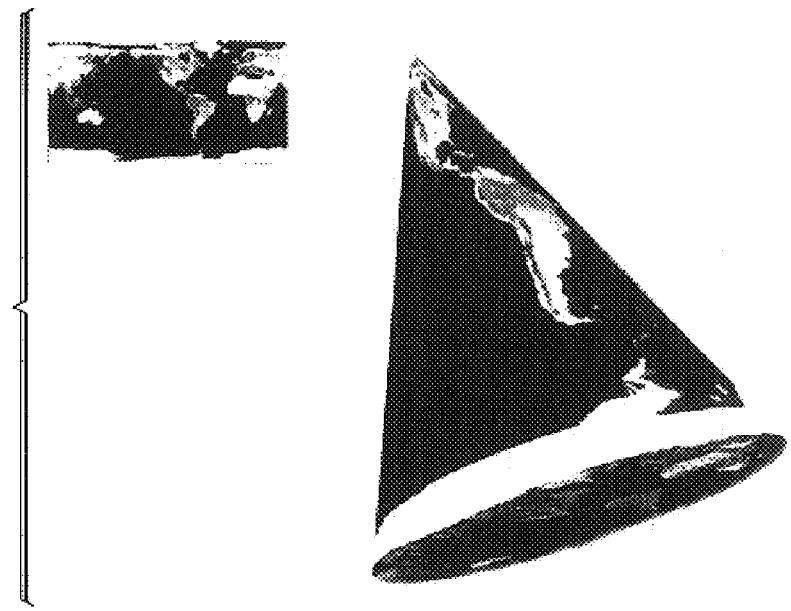
Figure 6A:
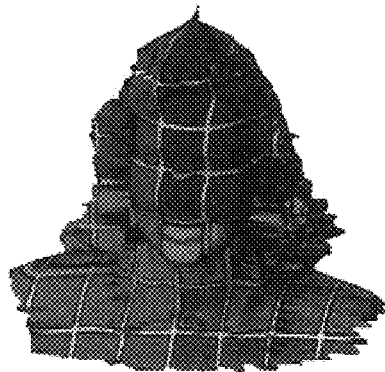
FIGS. 6A–6C show an example of a texture applied to a 3D object having an arbitrary surface topology.
Figure 6B:
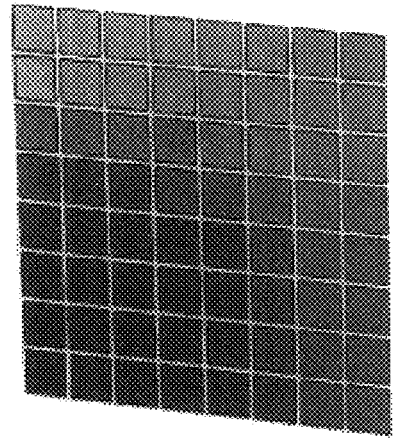
Figure 6C:
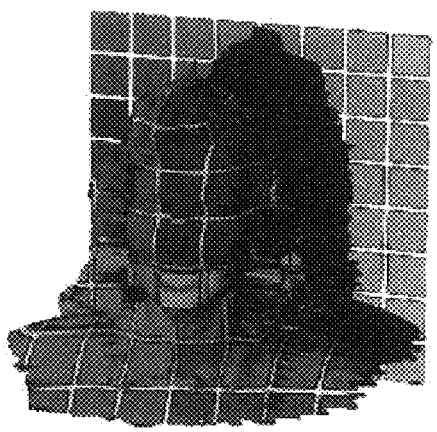
Figure 7:
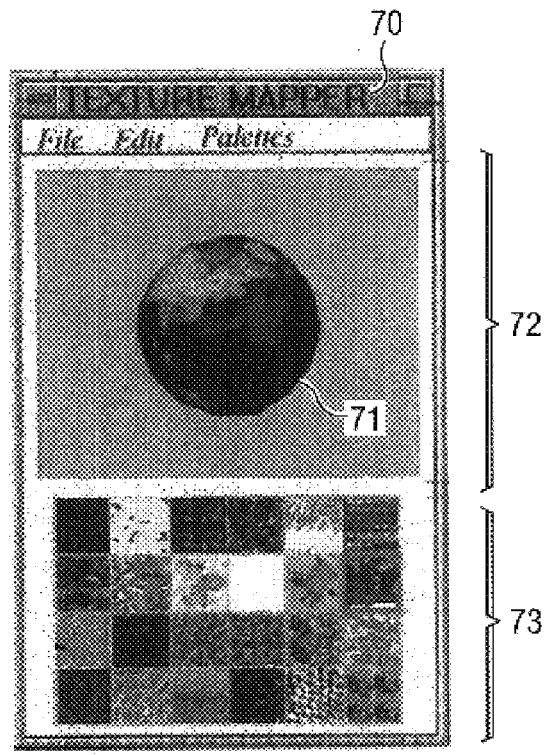
FIG. 7 shows an example of a graphic user interface utility for applying textures to 3D graphic objects.
Figure 8C:
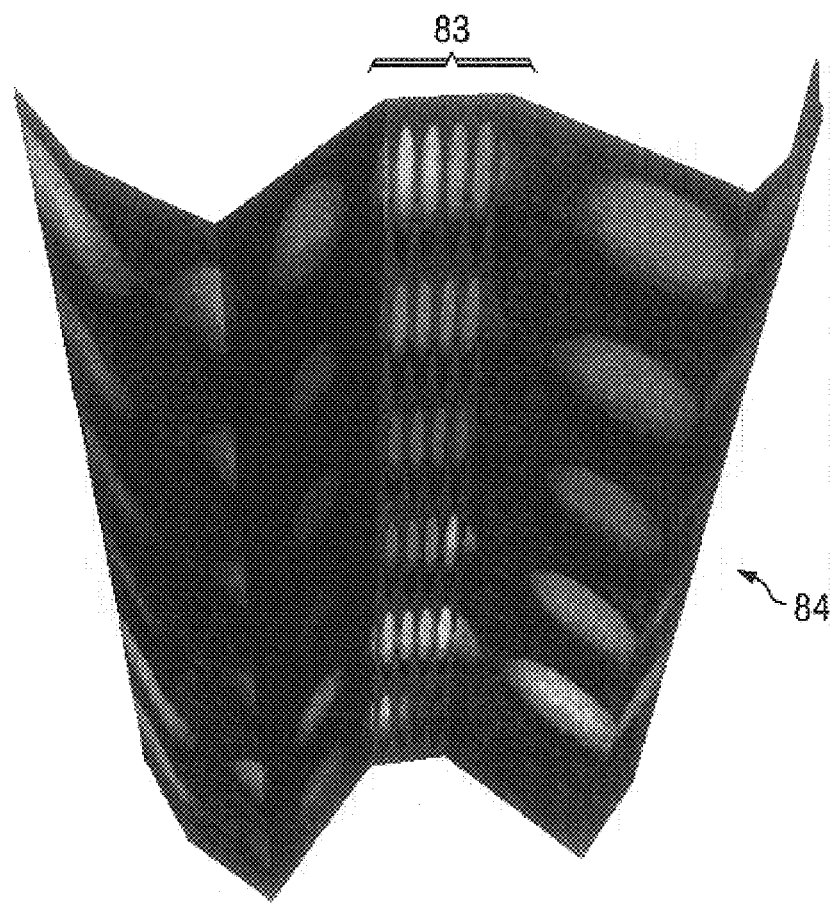

FIGS. 8A–8C show examples of two types of artifacts—"smearing" and "smudging"—which can occur when a texture is mapped onto the surface of a 3D object using the standard plane texture mapping function. In the example shown in FIGS. 8A and 8B, the multi-colored polka dot texture map 80 of FIG. 8A was mapped onto a 3D object 81 (a chess pawn) having a relatively complex surface topology, with the result of the mapping shown in FIG. 8B.

When a texture is applied to an object using the standard plane mapping function, texture mapping artifacts may not be readily apparent when the 3D object is rendered in a frontal view (i.e., looking straight ahead at the largest face of the bounding box) depending on the surface topology of the 3D object under consideration. However, when viewing a rendering of a 3D object as in FIGS. 8B or 8C, the texture mapping artifacts are readily apparent. For example, "smearing" of the polka dot texture (stretching the texture to the point of distortion) is evident on a face 82 of the object 81 in FIG. 8B. Similarly, "smudging" of the polka dot texture (compressing the texture to the point of distortion) is evident on a face 83 when the texture is applied to a different object 84 (a multi-fold screen) as shown in FIG. 8C.

The texture mapping artifacts illustrated in FIGS. 8B and 8C arise when a finite area of the surface of the object is mapped to a disproportionately sized region in the texture map. Smearing occurs when a designated area of the object is disproportionately large in comparison to the area of the texture to which the object is mapped. In effect, the texture's appearance becomes distorted as shown in FIG. 8B due to the extent to which the texture map must be stretched to cover the associated area of the 3D object.

Conversely, smudging occurs when the designated area of the object is disproportionately small in comparison to the area of the texture to which the object is mapped. In effect, the texture's appearance becomes distorted as shown in FIG. 8B due to the extent to which the texture map must be compressed to fit within the associated area of the 3D object.

Cosmo™ Worlds includes a Texture Applicator utility which provides an interactive GUI that enables users to correct artifacts such as smearing and smudging, or otherwise manipulate a texture mapping, by adjusting the relationship between individual points of the 3D object model and locations of texture coordinates on the texture map. User interaction with the Texture Applicator utility is based on Cosmo™ Worlds' PEP (Point-Edge-Polygon) editing paradigm. With PEP editing, users can designate and manipulate one or more of the points, edges or polygons (or any combination thereof) that make up a 3D object, rather than manipulating the 3D object as a whole. PEP editing is discussed in further detail in the online documentation referenced above, and in U.S. patent application Ser. No. 08/845,857, entitled "MANIPULATING GRAPHIC OBJECTS IN 3D SCENES," which is incorporated by reference.

The Texture Applicator employs a direct, as opposed to an indirect, object manipulation paradigm. With indirect manipulation tools, users do not work on the graphic object itself but rather use a separate graphical abstraction (e.g., a slider bar or a thumbwheel), typically appearing at a fixed location on the display screen, to bring about corresponding changes to the graphic object. Direct manipulation tools, in contrast, allow a user to manipulate a graphic object directly by placing the cursor in the proximity of the object, and dragging the cursor within the scene to affect the desired change to the object. In the case of the Texture Applicator, users can modify a texture mapping by directly adjusting positions within the texture space to which associated polygons of the 3D object are mapped. In general, a direct manipulation tool, such as the Texture Applicator, enhances the intuitiveness of a user's interactions with the tool and thus enables the user to accomplish a desired object manipulation more quickly, easily and precisely.

Figure 9A:
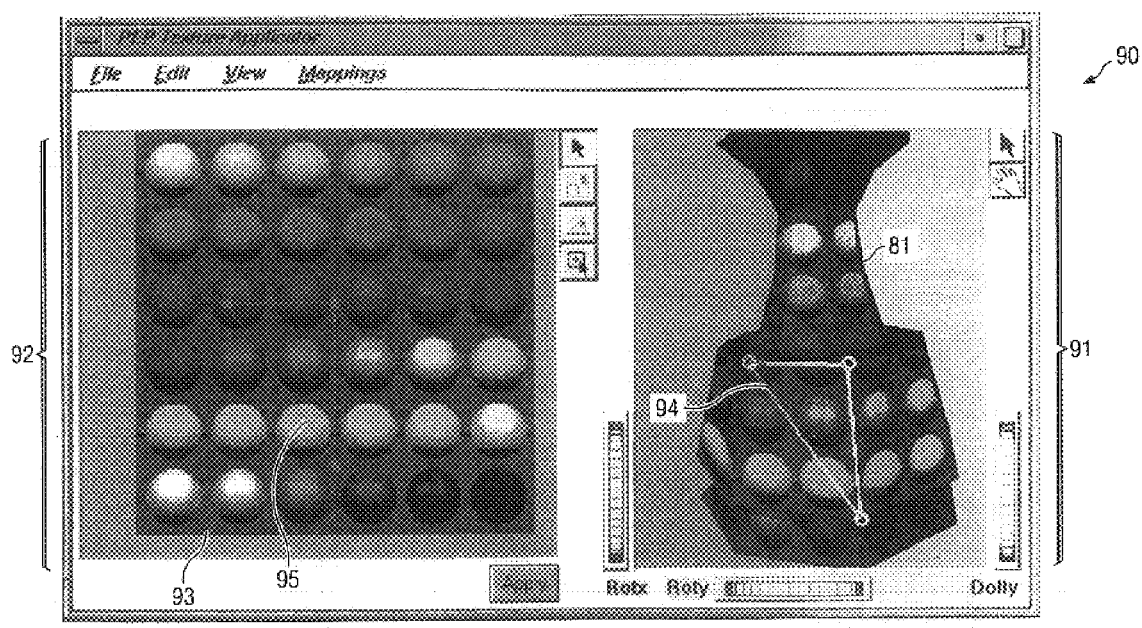
FIGS. 9A–9B and 10 show how object polygons are mapped to a texture in the PEP Texture Applicator window.
Figure 9B:
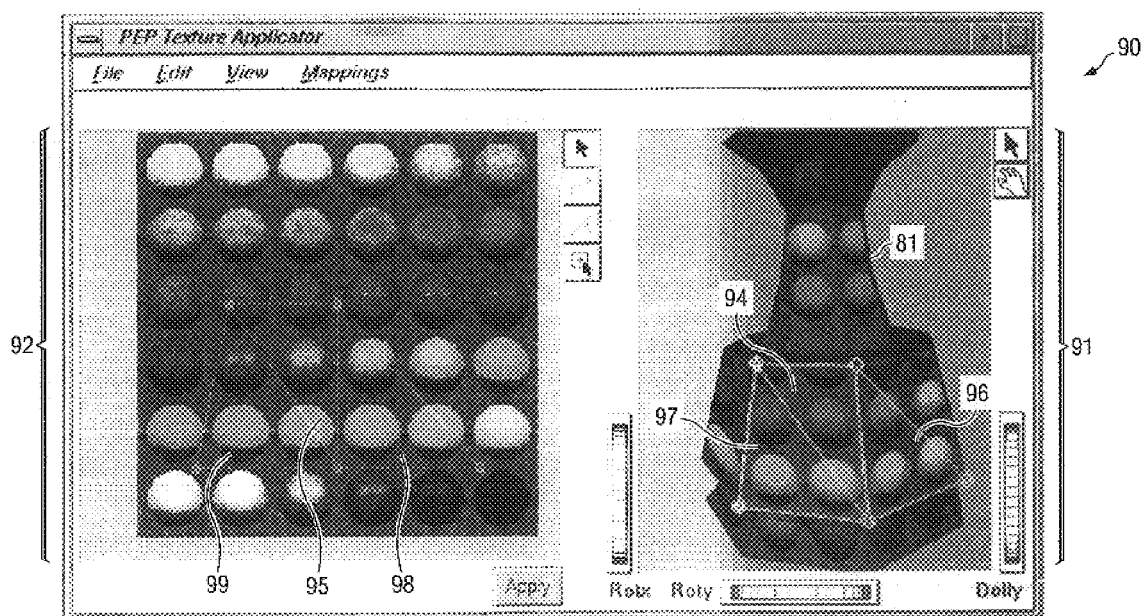

As shown in FIGS. 9A–9B, the Texture Applicator window 90 includes two regions: an object space region 91 on the right which displays a rendering of the 3D object 81 to which a texture is applied and a texture space region 92 on the left which provides a visual indication of how the texture map 93 is to be applied to the object 81. By performing appropriate mouse manipulations within these two regions 91 and 92, a user can specify a desired arbitrary mapping into the texture space for one or more of the individual polygons forming the 3D object (referred to as "object polygons"). To do so, the user first designates within the object space region 91 the one or more object polygons for which the texture mapping is to be manipulated. If no object polygons are selected, subsequent texture coordinate manipulation operations are performed on all object polygons forming the 3D object.

In the example of FIG. 9A, the user has selected for texture mapping manipulation a single object polygon 94, as indicated by the surrounding highlighting visual feedback. Specifically, the perimeter of the selected object polygon 94 is rimmed with a white line having a red stripe and white/red circles appear at each of the polygon's apexes. In response to the selection of the object polygon 94, three corresponding texture coordinates forming region 95 (formed from red lines connecting the texture coordinates with a small red block at each apex) are displayed in the texture space region 92 at a location corresponding to the current texture mapping for the selected object polygon 94. The lines between texture coordinates are intended to provide users with information about the relationships between texture coordinates. The user may select different or additional object polygons in the object space region 91 and their respective mappings into the texture space will be represented as corresponding sets of three or more texture coordinates in the texture space region 92. As shown in FIG. 9B, the user in this example has selected two additional object polygons 96 and 97 on either side of object polygon 94 and their respective mappings into the texture space are displayed accordingly in texture space region 92.

Figure 10:
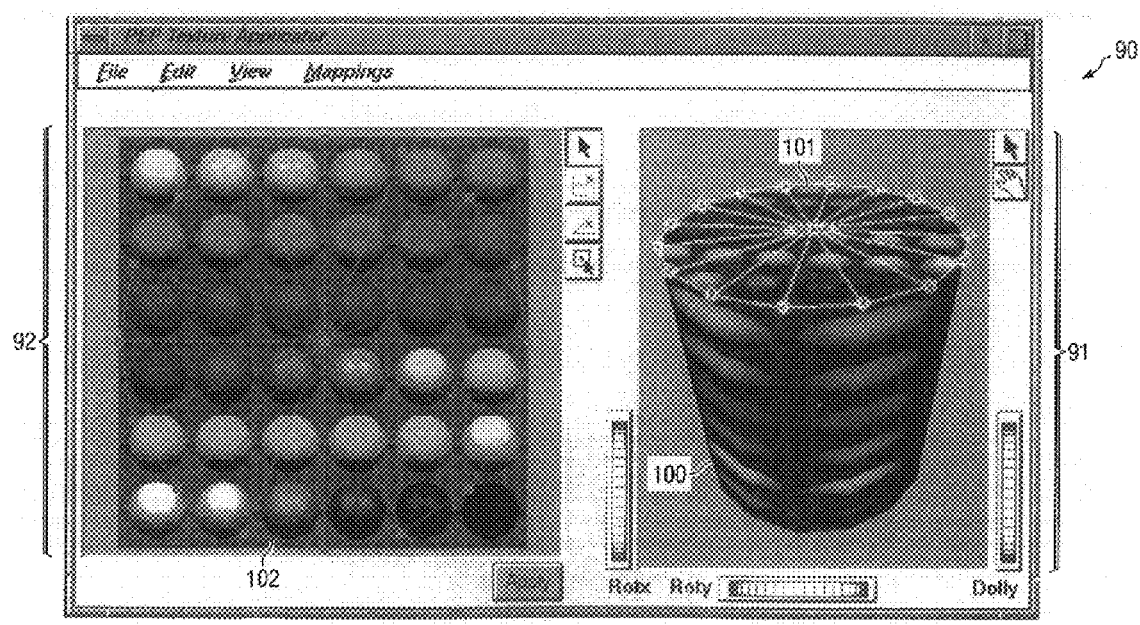

Similarly in the example of FIG. 10, which shows the texture mapping for a top end surface of a cylinder 100, the user has selected all of the 16 wedge-shaped object polygons 101 that form the cylinder's end surface. The corresponding mappings into the texture space for the selected object polygons are represented by the circular mesh 102 formed from 17 texture coordinates as displayed in the texture space region 92.

Once the user has selected one or more object polygons for which texture mapping manipulation is desired, the user then can modify the texture mappings for those object polygons using any of three basic modes: translation, scaling or rotation.

Figure 11A:
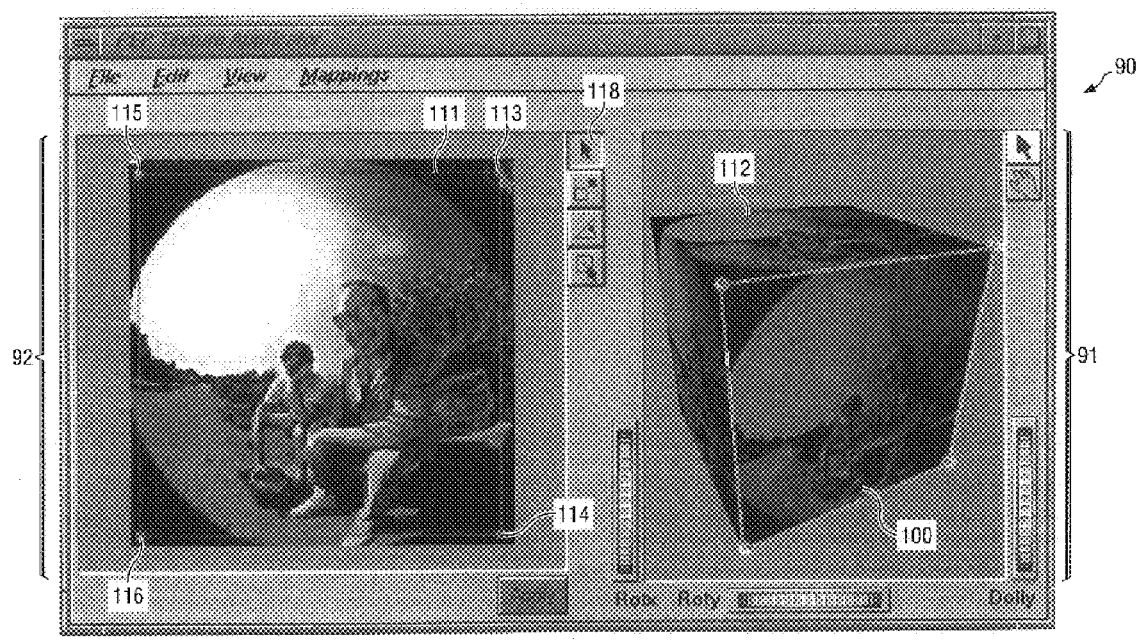
FIGS. 11A–11B are before and after views of modifying a texture mapping by translating a single texture coordinate.
Figure 11B:
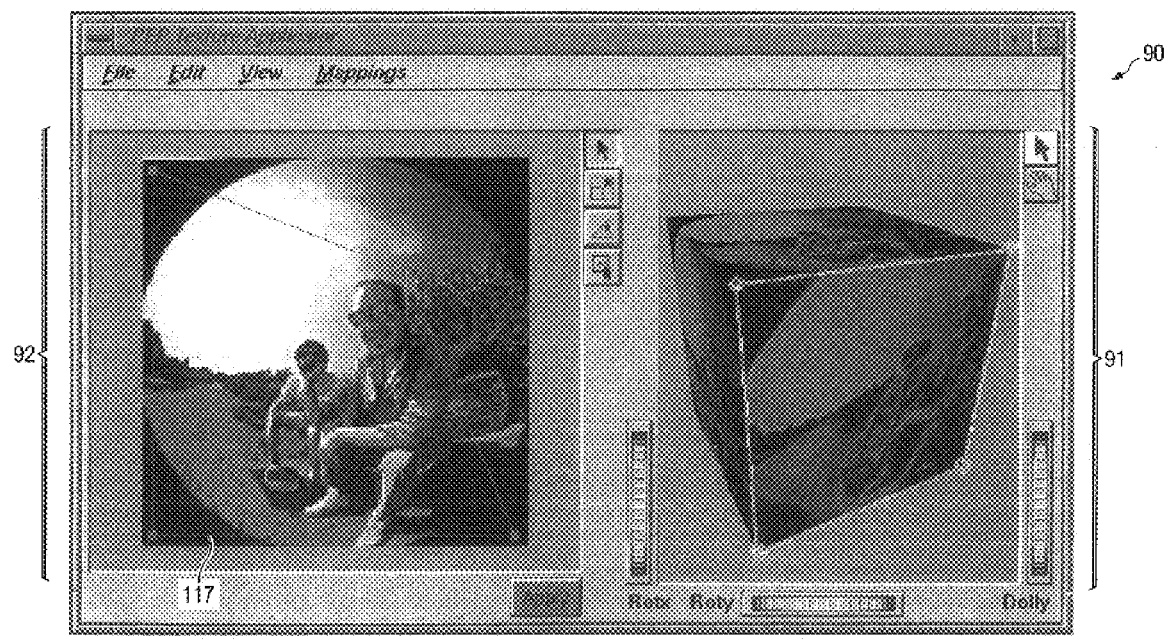

FIGS. 11A–11B illustrate an example of modifying a texture mapping using translation, as indicated by the active state of the arrow button 118 in the Texture Applicator window 90. As shown in FIG. 11A, the user has selected in object space region 91 a single object polygon 110 which corresponds to an entire face of cube 112. The associated mapping into the texture space for object polygon 110 is indicated in texture space region 92 by four texture coordinates (113, 114, 115, 116) which form a square region 111. The user can modify the texture mapping for object polygon 110 by moving one or more of the four texture coordinates (113, 114, 115 or 116) within the texture space region 92.

As indicated by the surrounding red circle and the adjacent cursor, the user in this example has selected a single texture coordinate 113. The user then modifies the texture mapping by dragging texture coordinate 113 toward the center of the texture map thereby transforming the square region 111 into an irregularly shaped region 117, as shown in FIG. 11B. As the user drags the texture coordinate 113 with the cursor, the display of the cube 112 in the object space region 91 is updated in real time to reflect the current texture mapping as it is being modified. In this example, the user's cursor manipulations have caused a reduced area of the texture map (i.e., the area bounded by region 117 in FIG. 11B) to be mapped to face 110 of cube 112. Because the area of the texture map bounded by region 117 is now smaller than the area of face 110, the designated portion of the texture map is stretched to cover face 110, giving the cube 112 the appearance shown in FIG. 11B.

Figure 12A:
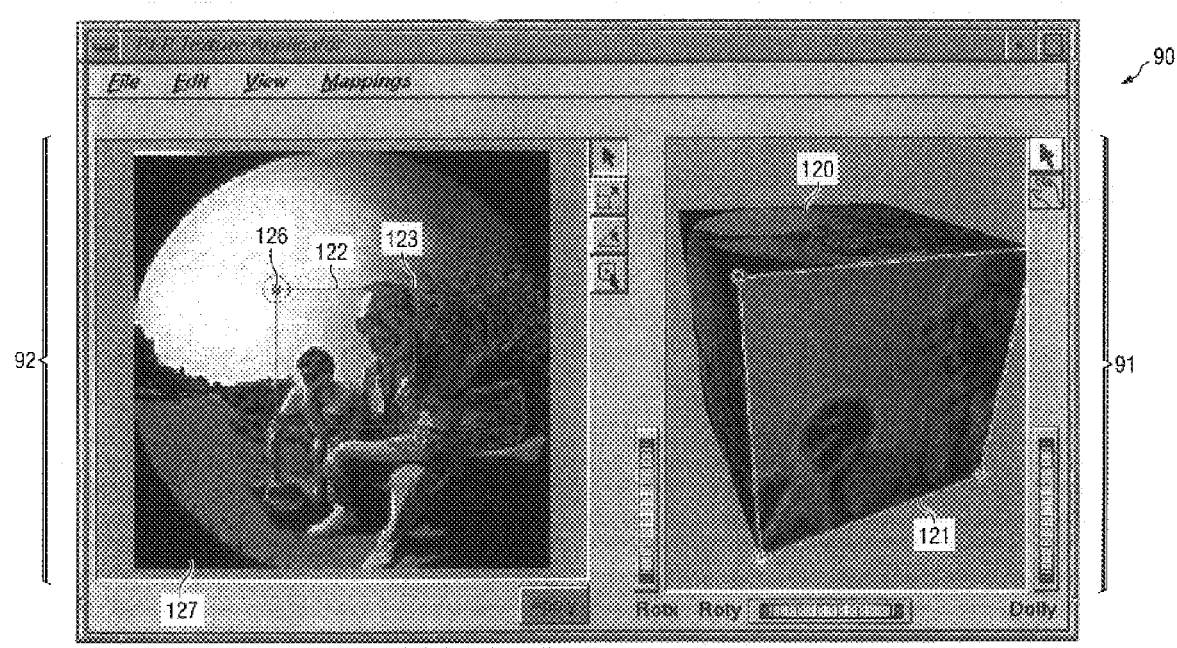
FIGS. 12A–12B are before and after views of modifying a texture mapping by translating multiple texture coordinates.
Figure 12B:
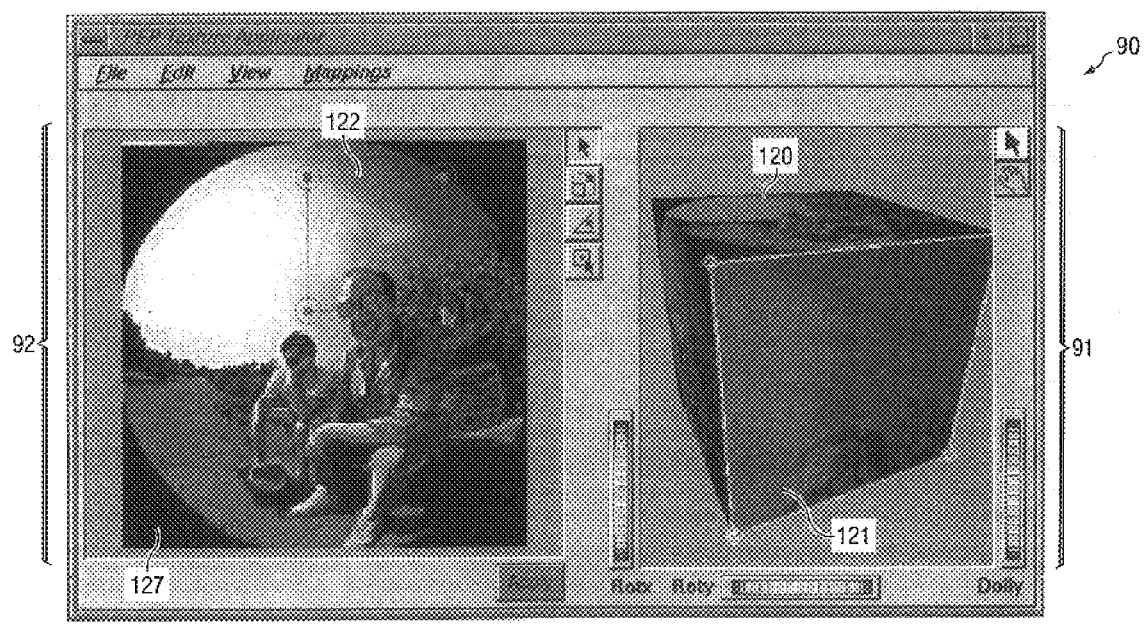

In FIGS. 12A–12B, which show another example of modifying a texture mapping using translation, the user has designated a face 121 of a cube 120 as the object polygon for which texture mapping is to be modified. The corresponding mapping into the texture is represented by four texture coordinates (123, 124, 125 and 126) which form region 122, and which occupy only a subset of the overall texture map 127. In this example, the user has selected all four of the texture coordinates (123, 124, 125 and 126) that form the region 122 and has dragged them as a group to a new location on the texture map 127 as shown in FIG. 12B. In response, the display of the cube 120 in the object space region 91 is changed in real time to reflect the modified texture mapping, which in this case does not require any stretching or compression of the texture but rather simply reflects a different subset of the texture map 127.

Figure 13A:
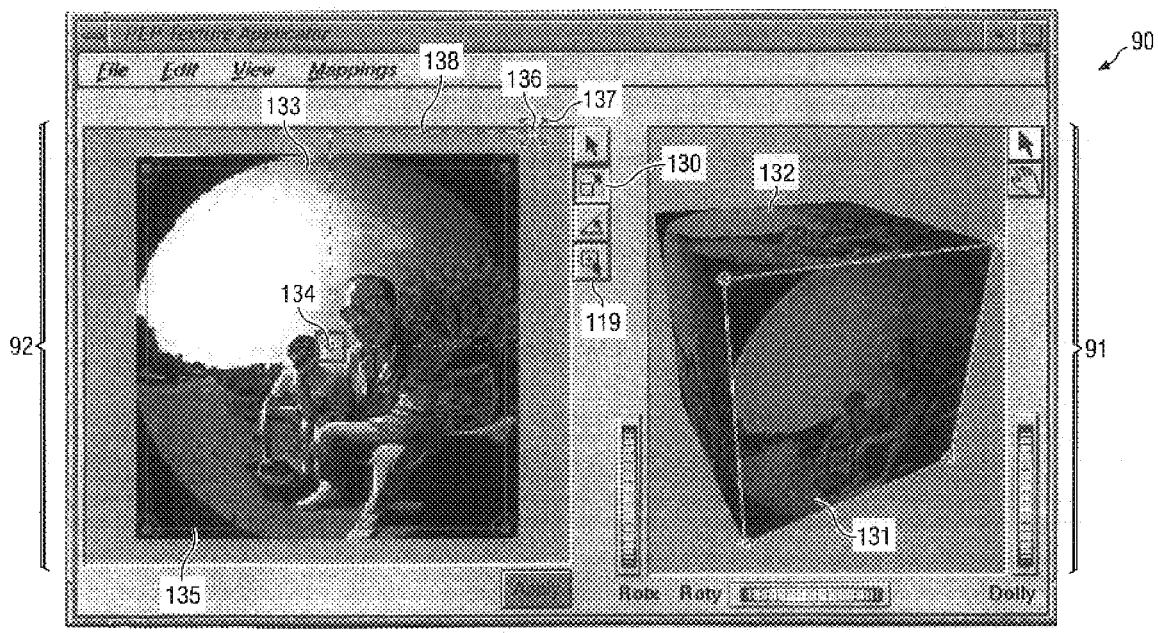
FIGS. 13A–13B are before and after views of modifying a texture mapping by scaling texture coordinates.
Figure 13B:
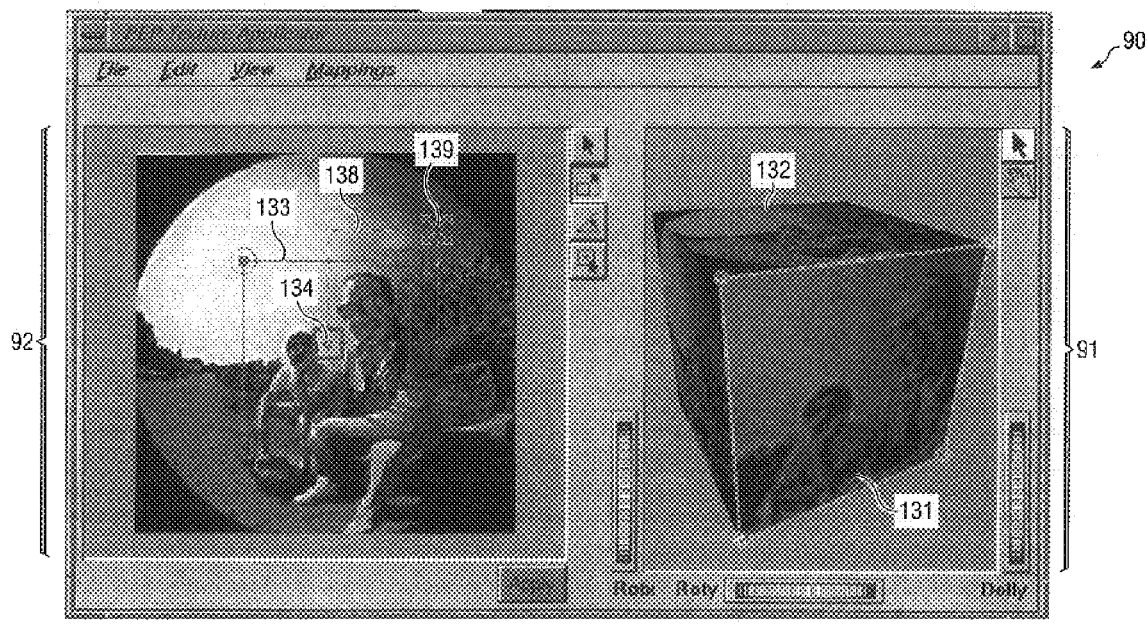

FIGS. 13A–13B illustrate an example of modifying a texture mapping using scaling, as indicated by the active state of the scaling button 130 in the Texture Applicator window 90. As shown in FIG. 13A, the user has selected a single object polygon 131 which corresponds to an entire face of cube 132. The associated mapping into the texture space for object polygon 131 is indicated in texture space region 92 by the four texture coordinates forming region 133. The user then can modify the texture mapping for the selected object polygon by scaling the four texture coordinates forming region 133 as desired (larger or smaller) about a point (the "scale-about" point 134) specified by the user. Positioning of the scale-about point is accomplished by clicking on a button 119 (or simply by clicking the cursor on the scale-about point provided it is visible in the current view) and then dragging the scale-about point to the desired location.

As indicated by the surrounding red box, the user in this example has positioned the scale-about point 134 at the center of region 133 (which happens to coincide with the center of the texture map 135). To cause the selected face 131 of the cube 132 to be mapped to a smaller portion of the texture map 135 (equivalently, to reduce the area bounded by region 133), the user clicks the mouse button down anywhere within the texture space region 92 (in this example, at click-down point 136 in FIG. 13A) and drags the cursor toward the scale-about point 134. Upon clicking down, visual feedback is provided to the user in the form of a four-headed arrow 137 (to indicate that the cursor may be moved in any direction) and a box 138 formed of blue-and-white dashed lines which rubber-band to continuously occupy the space between the scale-about point 134 and the current cursor point as the user moves the cursor within texture space region 92 (to give the user a sense of the relative distance over which scaling has occurred).

As shown in FIG. 13B, the user in this example has dragged the cursor from the click-down point 136 to a point 139, and the region 133 that corresponds to the texture mapping accordingly has shrunk to roughly a quarter of its original size. The resultant texture mapping for face 131, showing an effective magnification of the texture relative to its appearance in FIG. 13A, is displayed in object space region 91.

Alternatively, the user could have increased the size of the area bounded by region 133 (i.e., the area of the texture map to which a selected object polygon is mapped) by dragging the cursor away from the designated scale-about point. In that case, a larger portion of the texture map 135 would have been mapped to face 131 as a result.

Figure 14:
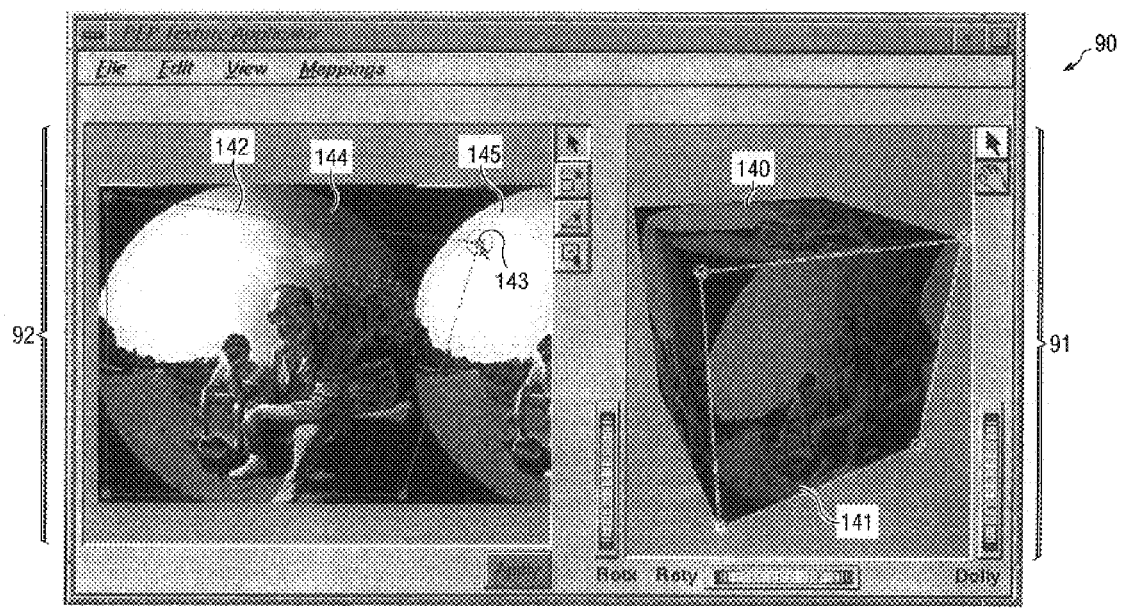
FIG. 14 illustrates the automatic texture map repetition feature of the PEP Texture Applicator.

If a user attempts to increase the area of a region formed from texture coordinates beyond the size of a single instance of the texture map, the Texture Applicator utility repeats the texture map automatically as needed. As shown in FIG. 14, for example, after selecting face 141 of cube 140 for texture mapping modification, the user has dragged one of the points (point 143) that defines the region 142 to the right beyond the border of the texture map 144. In response, the texture map 144 is repeated automatically causing another instance 145 of the texture map to appear in the texture space region 92. In response to user interactions, the texture map will continue to be repeated automatically in any or all directions to accommodate virtually any size of mapping. Similarly, repeated instances of the texture map will disappear as needed in response to a reduction in the size of the mapping.

Figure 15A:
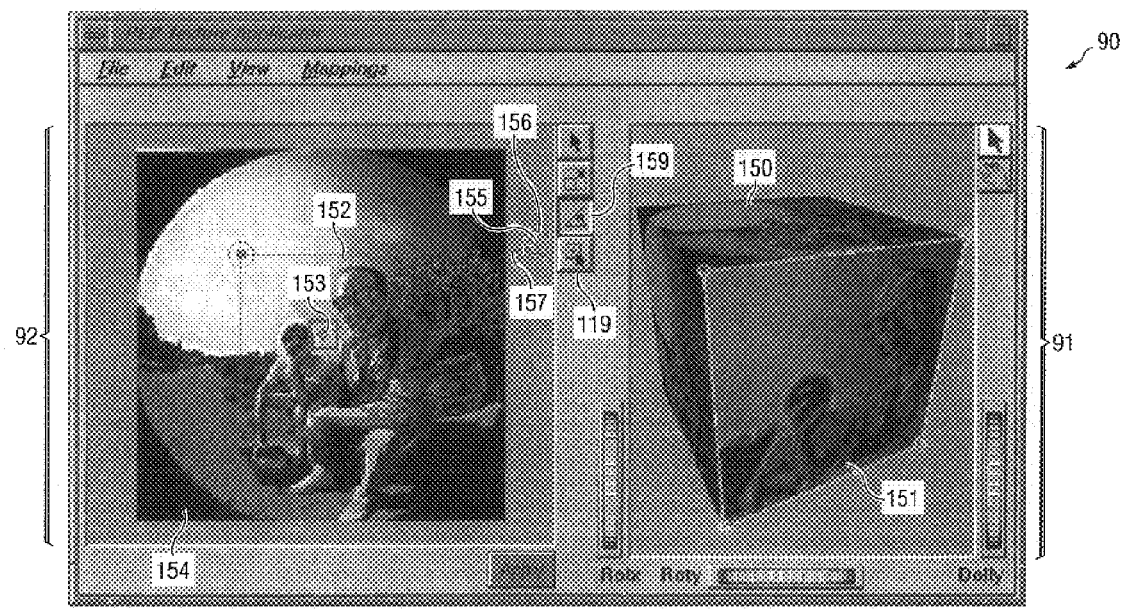
FIGS. 15A–15B are before and after views of modifying a texture mapping by rotating texture coordinates.
Figure 15B:
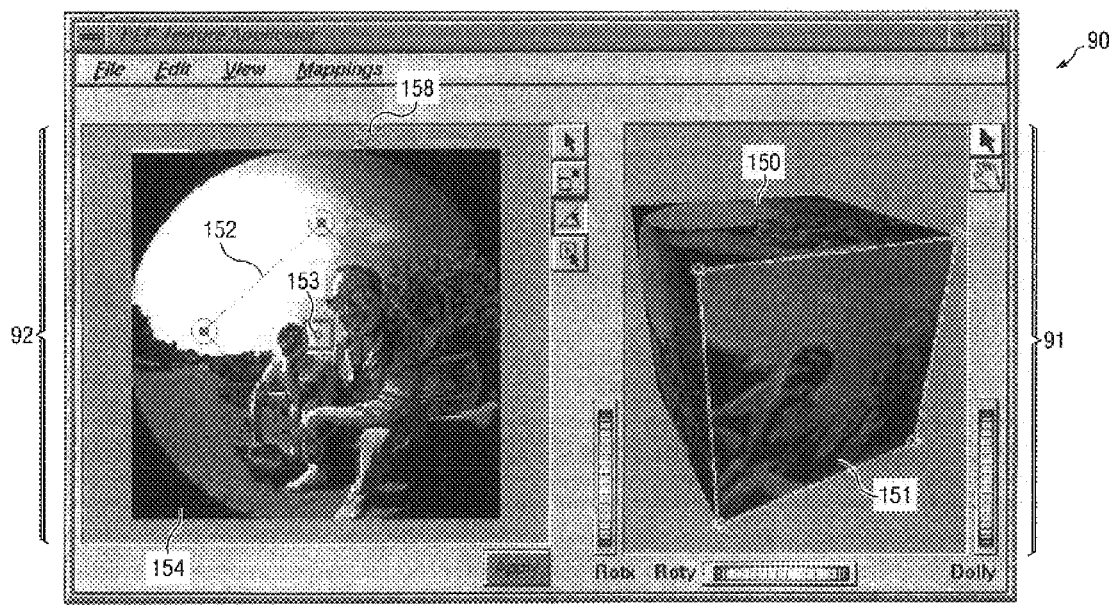

FIGS. 15A–15B illustrate an example of modifying a texture mapping using rotation, as indicated by the active state of the rotation button 159 in the Texture Applicator window 90. As shown in FIG. 15A, the user has selected a single object polygon 151 which corresponds to an entire face of cube 150. The associated mapping into the texture space for the face 151 is indicated in texture space region 92 as four texture coordinates forming a square region 152. The user then can modify the texture mapping for the face 151 by rotating selected texture coordinates as desired (clockwise or counterclockwise) about a point (the "rotation point") specified by the user. Positioning of the rotation point is accomplished in the same manner as positioning of the scale-about point during scaling—namely, by clicking on the button 119 (or simply by clicking the cursor on the rotation point provided it is visible in the current view) and then dragging the rotation point to the desired location.

As indicated by the surrounding red box, the user in this example has positioned the rotation point 153 at the center of region 152 (which happens to coincide with the center of the texture map 154). To cause the texture coordinates forming region 152 to rotate to occupy a different subset of the texture map 154, the user clicks the mouse button down anywhere within the texture space region 92 (in this example, at click-down point 155 in FIG. 15A) and drags the cursor in a counterclockwise direction about the rotation point 153. Upon clicking down, visual feedback is provided to the user in the form of a partial circle 156 formed of two arced arrows (to indicate that the cursor may be rotated in either direction) and a blue-and-white dashed line 157 which rubber-bands to continuously extend between the rotation point 153 and the current cursor point as the user moves the cursor within texture space region 92 (to give the user a sense of the relative degree to which rotation has occurred).

As shown in FIG. 15B, the user in this example has dragged the cursor from click-down point 155 to a point 158 and the four texture coordinates forming region 152 have rotated about the rotation point 153 by roughly 45 degrees from its original orientation. The resultant texture mapping for face 151 is displayed in object space region 91.

In the default state, each object polygon in a 3D object shares both object coordinates and texture coordinates with its neighboring polygons. As a result, when the texture mapping for one polygon is changed, the texture mappings for all neighboring polygons also change necessarily. Sometimes this behavior is desirable but other times it is not. The Texture Applicator allows users to sever shared texture coordinate relationships between object polygons selectively (referred to as "breaking instancing"), thus enabling each object polygon (or a combination of two or more object polygons) to have a separate texture mapping independent of the texture mappings for other object polygons in the 3D object.

Figure 16A:
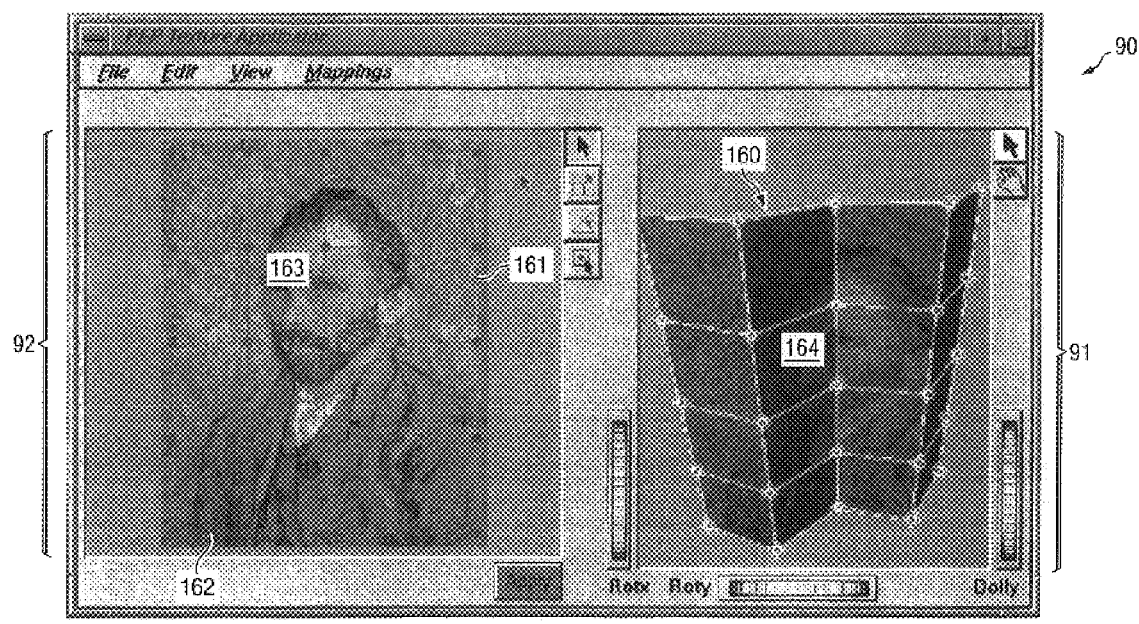
FIGS. 16A–16E are successive screen shots showing an example of breaking shared texture coordinates between object polygons.
Figure 16B:
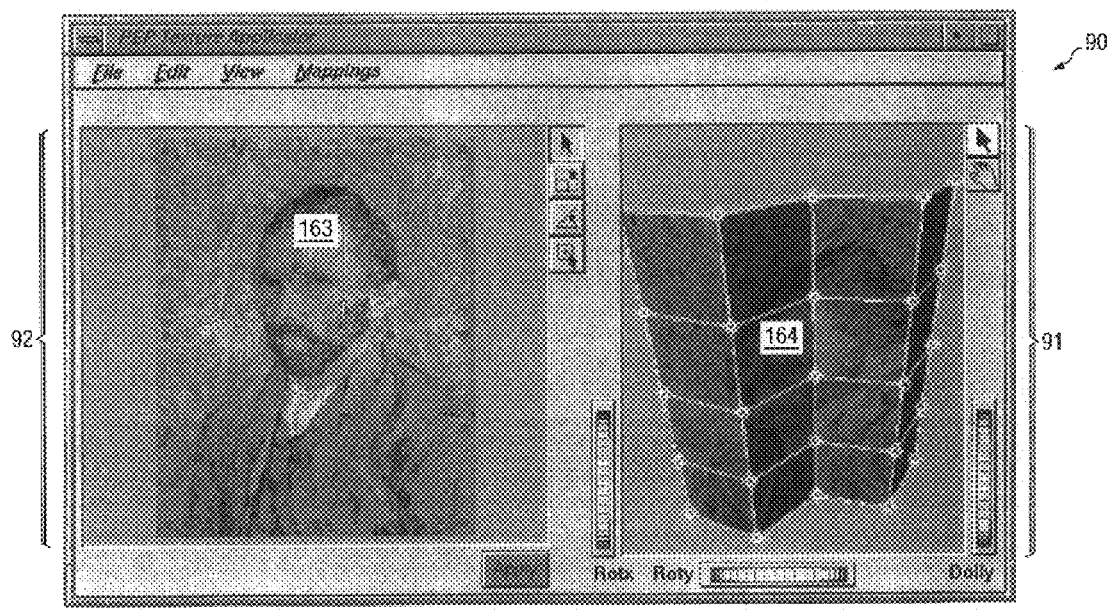

FIGS. 16A–16E illustrate an example of breaking instancing between adjacent object polygons so that they no longer share texture coordinates in the texture space. In lo this example, the 3D object is a multi-fold screen 160 formed of 16 object polygons as shown in FIG. 16A. All 16 of the object polygons have been selected and the corresponding mapping into the texture space is represented by the grid 161 (formed of 25 corresponding texture coordinates) displayed in the texture space region 92. As shown in FIG. 16B, when the user drags the four texture coordinates that define region 163 (which corresponds to the mapping for object polygon 164) to a new location on the texture map 162, the eight regions surrounding region 163 deform to follow its movement. This is because the four texture coordinates that were moved are shared by the nine different object polygons. As a result, the texture mappings for object polygon 164 and its eight surrounding object polygons are changed in a corresponding manner.

If the user desires to modify the texture mapping for one or more object polygons without affecting the texture mappings of its neighboring object polygons, the user can break instancing between a designated object polygon and its neighbors by selecting the "break instancing" option under the Edit menu of the Texture Applicator utility.

Figure 16C:
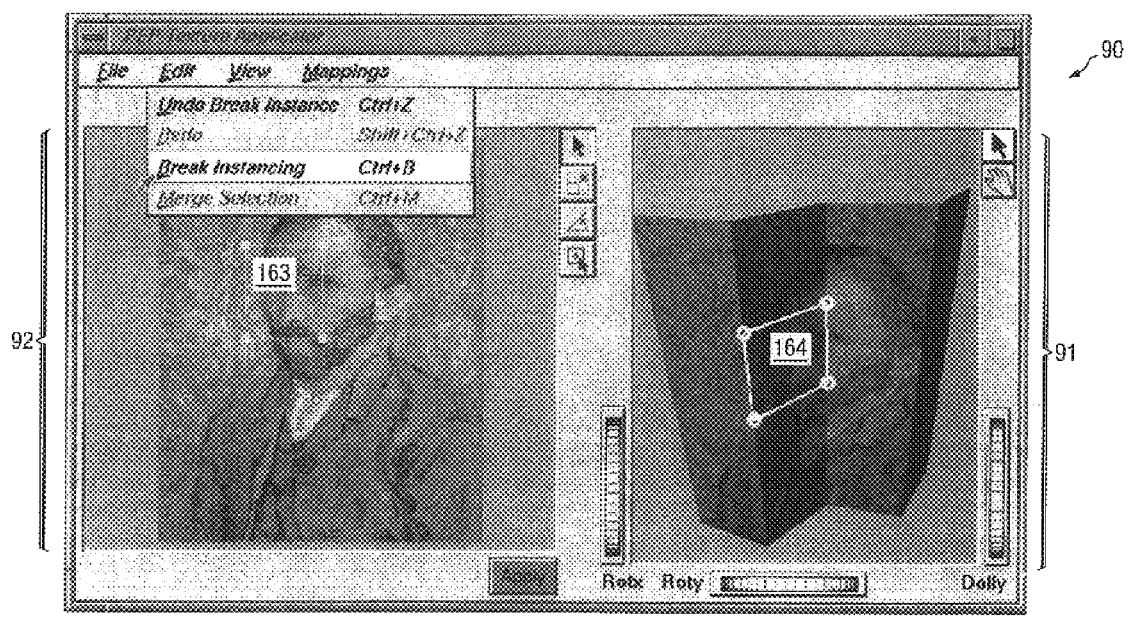

In this example, the user has selected object polygon 164 and has broken instancing between object polygon 164 and its neighbors as shown in FIG. 16C. Consequently, the user now can modify the texture mapping for object polygon 164 without affecting the texture mappings of its neighbors by moving the corresponding four texture coordinates forming region 163 to the desired location on the texture map 162.

Figure 16D:
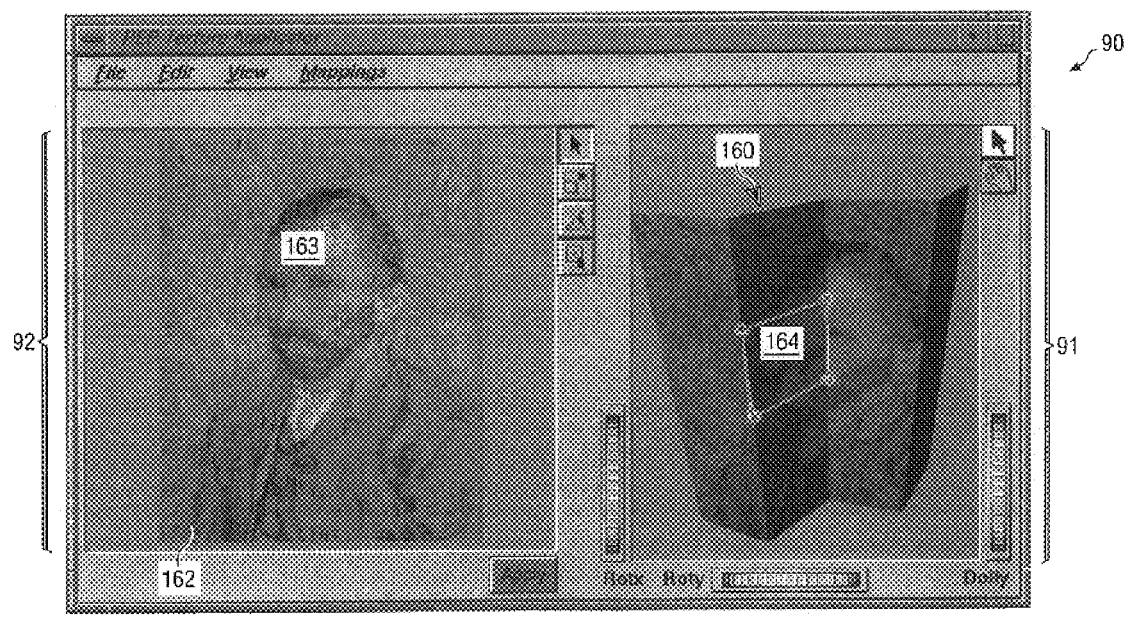
Figure 16E:
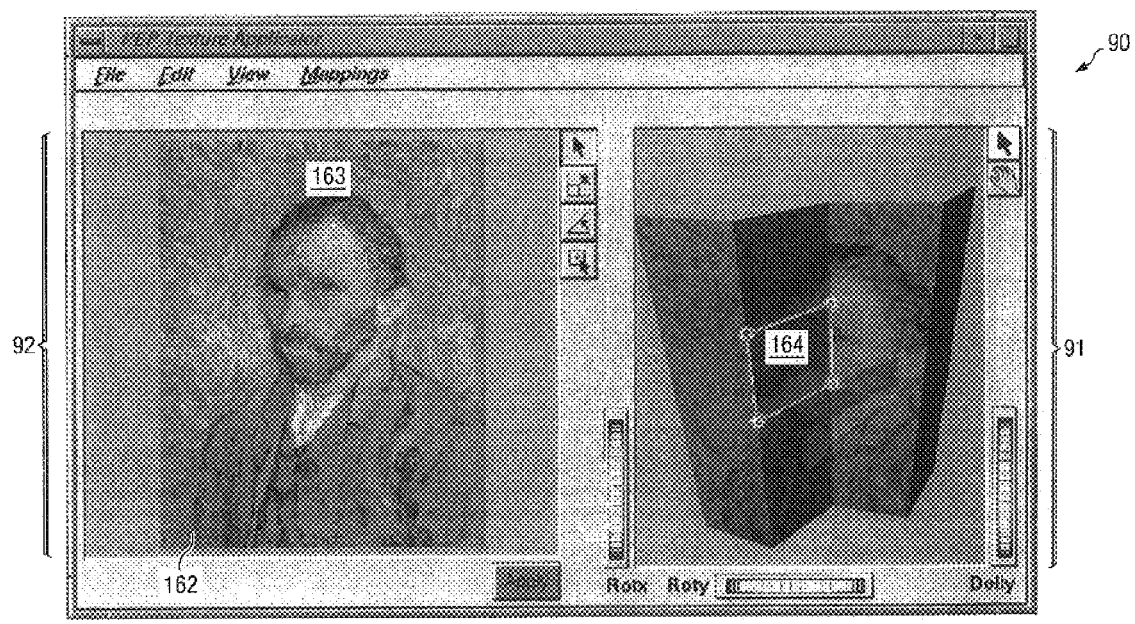

As shown in FIG. 16D, the user has moved the four texture coordinates which form region 163 slightly up and to the right thereby modifying the texture mapping for object polygon 164, but not for any of the other object polygons. As a result, the overall image on the screen 161 appears in FIG. 16D as a modified self-portrait of Vincent van Gogh having three eyes. As the user moves the texture coordinates 163 up further relative to the texture map 162 (to the top of van Gogh's head), the texture mapping for object polygon 164 changes accordingly as shown in FIG. 16E.

FIGS. 17A–17J illustrate an example of using the various texture manipulation features provide by the Texture Applicator to fine tune a texture mapping according to a user's preferences.

Figure 17A:
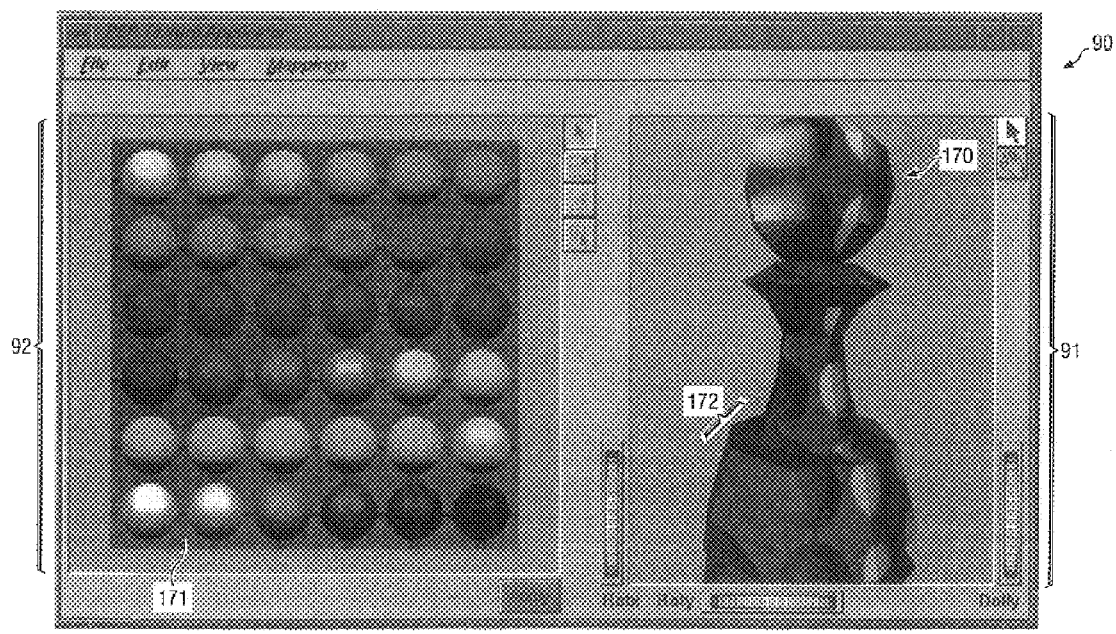
FIGS. 17A–17J are successive screen shots showing an example of modifying a texture mapping to correct artifacts.

FIG. 17A shows the Texture Applicator window for a chess pawn 170 having a polka dot texture map 171 which was applied using the standard plane texture mapping function, and which has resulted in smearing of the texture across several object polygons in the region 172. To correct the smearing, and otherwise modify the standard texture mapping function that was applied to the pawn 170, the user has a number of options available, including being able to designate a "best fit" mapping function (under the "Mapping" menu choice) for applying the texture map 171 to one or more selected portions of the pawn 170. In this example, the user has not selected any of the object polygons forming the pawn 170 so any texture mapping modification that is performed will operate on all of the pawn's object polygons.

Figure 17B:
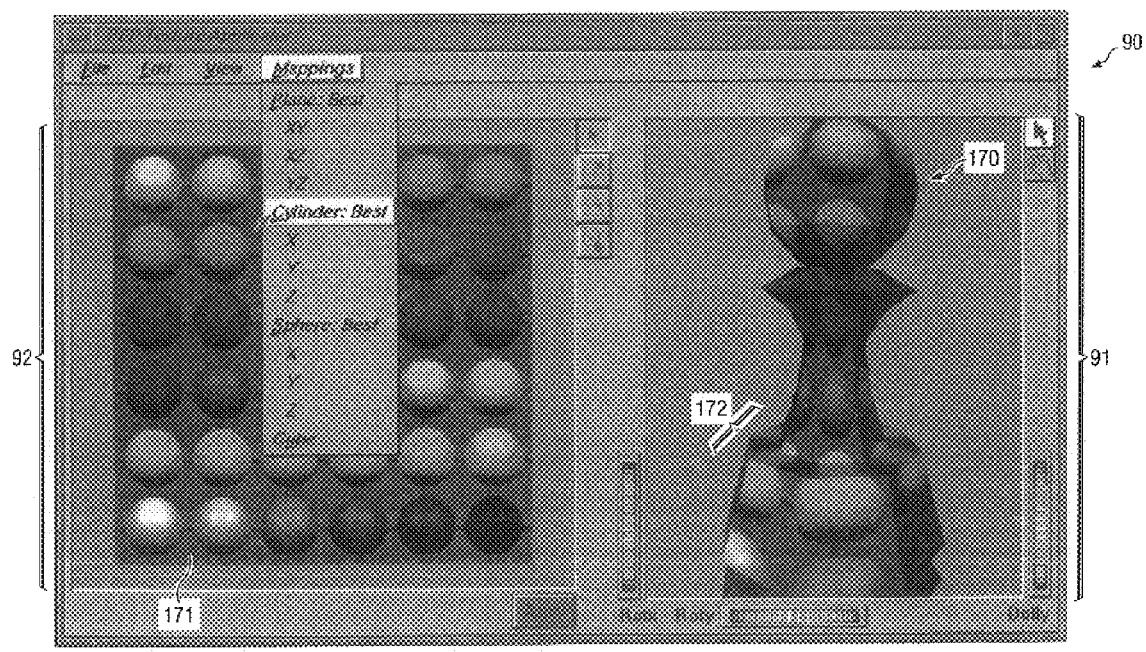

As shown in FIG. 17B, because the shape of the pawn most closely approximates a cylinder (rather than some other primitive), the user in this example has specified that the standard cylinder texture mapping function should be used to map the texture 171 onto the pawn. As a result of this new texture mapping, the appearance of the pawn 170 changes accordingly including a reduction in the amount of texture smearing in region 172.

Figure 17C:
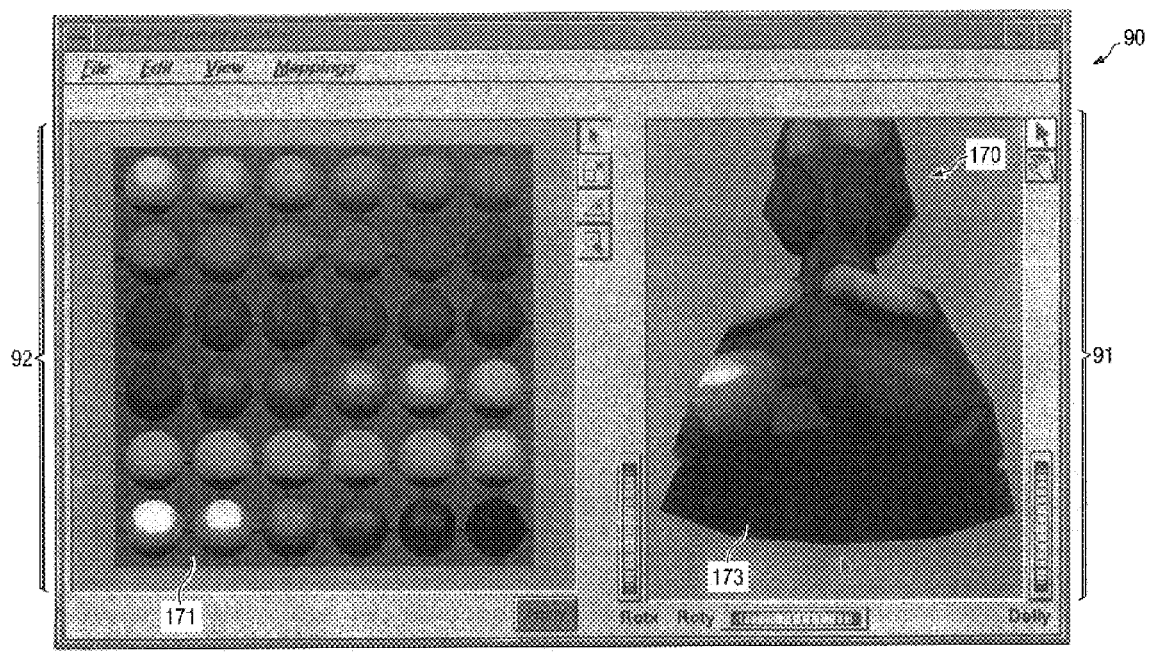

Because a single standard texture mapping function ordinarily does not match an arbitrarily complex shape, applying different standard mapping functions to different portions of a 3D graphic often can produce more realistic results. In this example, the cylindrical mapping function applied to the pawn has resulted in an undesirable (e.g., non-realistic) mapping on the bottom of the pawn. The user accordingly has decided to modify the texture mapping on the bottom surface of the pawn 170 by applying a different standard mapping function exclusively to the bottom surface. To do so, the user first reorients the rendering of the pawn 170 in the object space region 91 (through direct object manipulations or by using the Rotx, Roty and Dolly thumbwheels as appropriate) to make the pawn's bottom surface 173 visible to the user as shown in FIG. 17C.

Figure 17D:
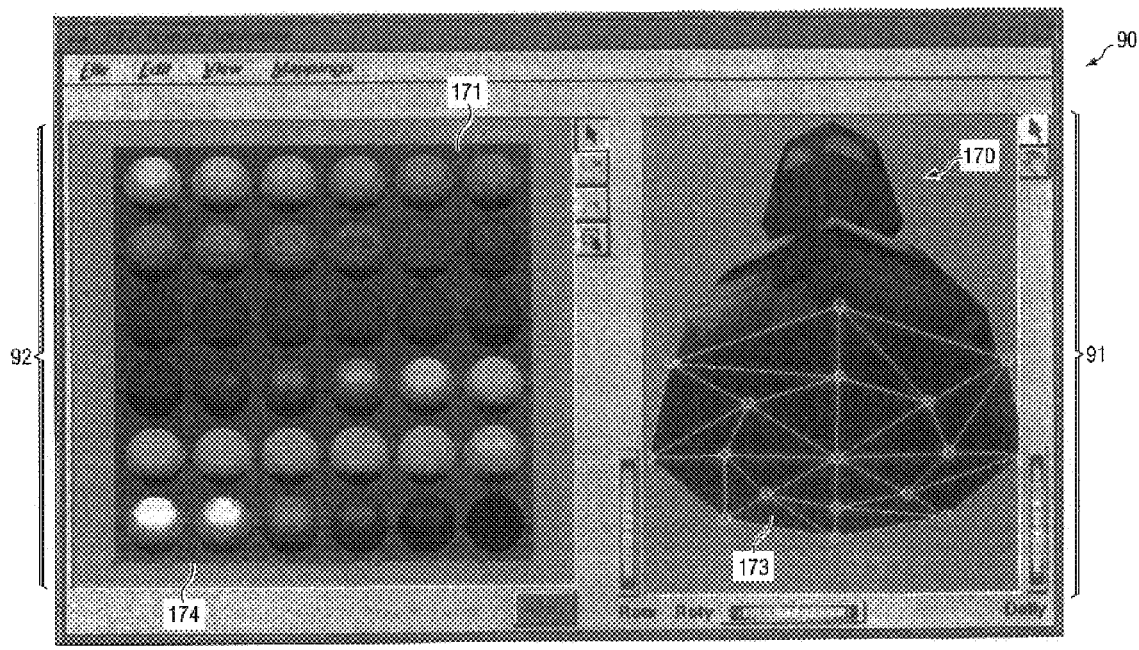
Figure 17E:
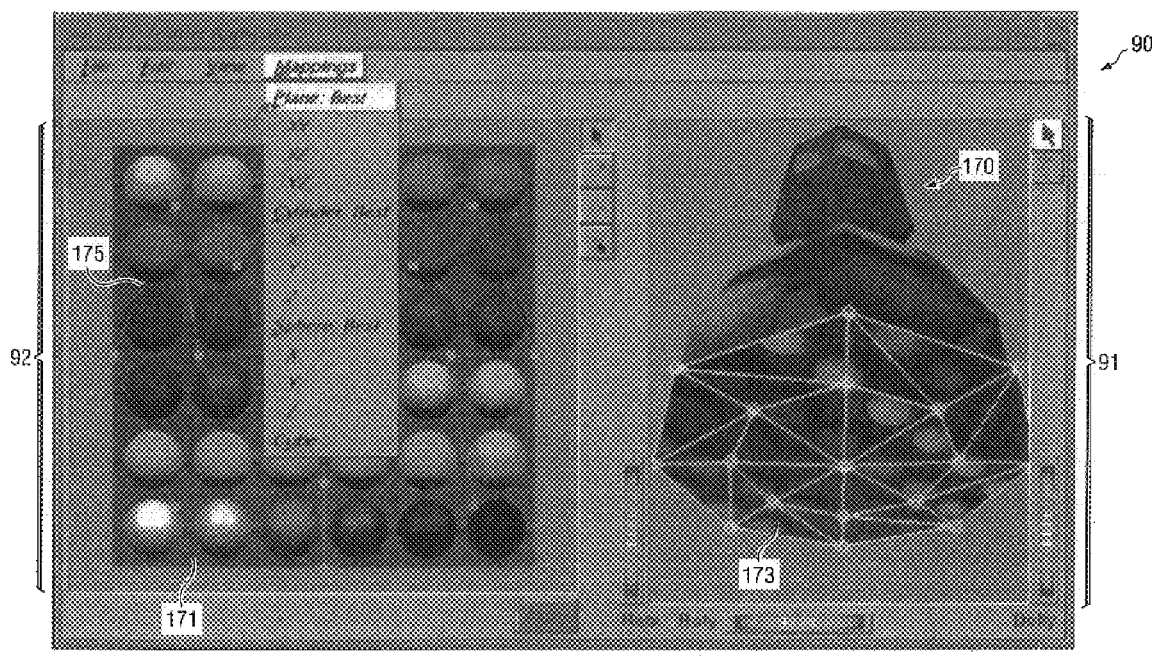

As shown in FIG. 17D, once the user has selected all of the 24 object polygons that form the pawn's bottom surface 173, the corresponding mappings into the texture space are displayed in the texture space region 92 as a red line 174 with small red blocks marking the associated texture coordinates. Because the 24 object polygons are mapped to a single line 174 in the texture space, the pawn's bottom surface appears to have little or none of the texture map applied to it.

To correct this situation, the user has specified a new "best fit" mapping function for the pawn's bottom surface— namely, the standard plane texture mapping function. In response, a standard plane texture mapping function is applied to the 24 object polygons forming the pawn's bottom surface 173, as indicated by the changed appearance of the pawn's bottom surface 173 in FIG. 17E. At the same time, the new texture mapping is displayed in the texture space region 92 as an octagonal mapping mesh 175 of 17 texture coordinates forming 24 regions which effectively are laid directly on top of the texture map 171.

The "Plane:Best" texture mapping function specified by the user is applied only to the currently selected portion of the object—in this example, the 24 object polygons forming the pawn's bottom surface 173. The texture mappings for the object's other, unselected polygons are unaffected. By selectively applying different standard texture mapping functions to different portions of the 3D object, a user is able to tailor the texture mappings for the larger features of the 3D object quickly and easily.

Figure 17F:
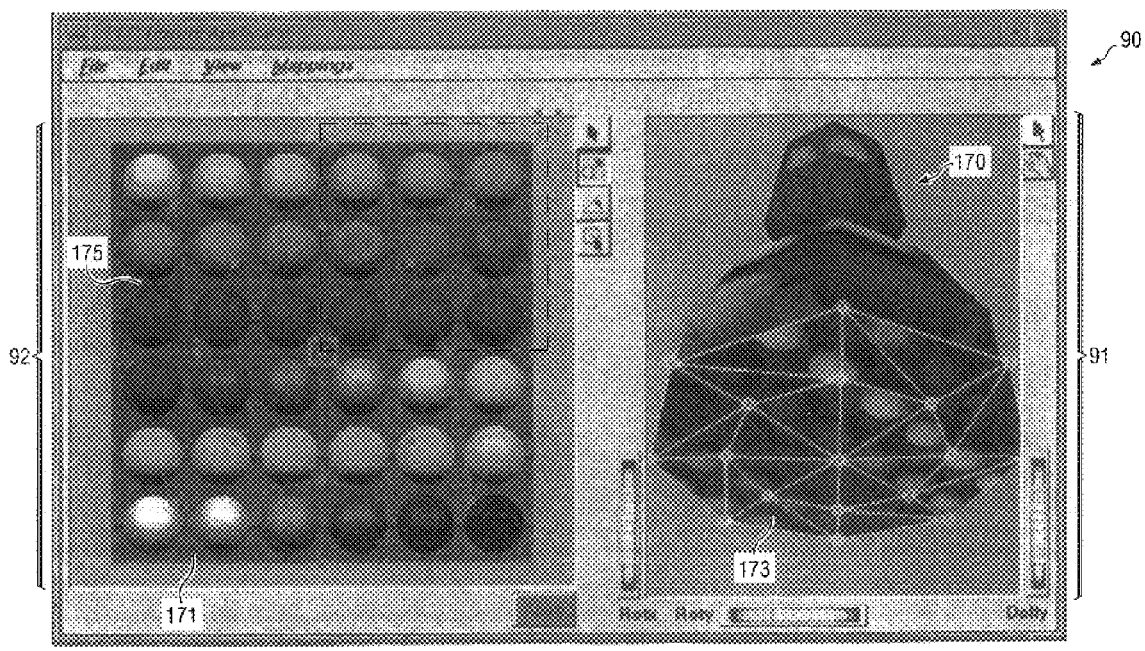
Figure 17G:
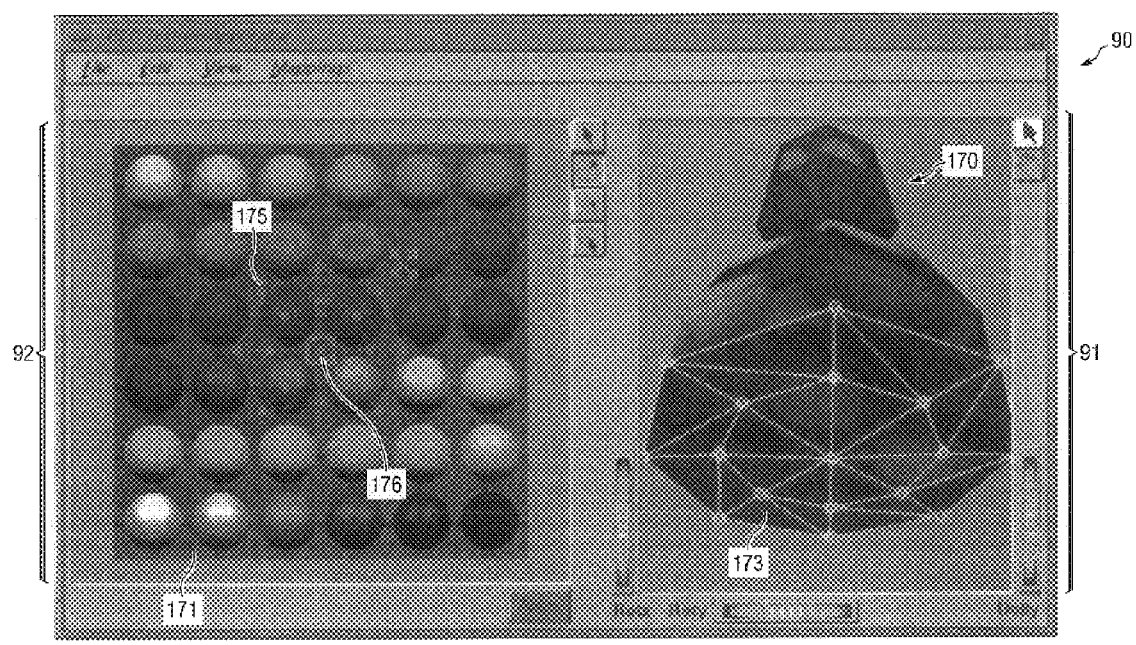

As shown in FIGS. 17F and 17G, the user next has decided that the texture dots on the bottom surface 173 of the pawn 170 appear too small relative to the other dots on the body of the pawn. To change the size of the dots on the bottom surface 173, the user scales the mapping mesh 175 (and thus all of the 17 texture coordinates forming the mesh) about its center point 176 down to roughly one-fourth of its original size, as shown in FIG. 17G. As a result, the texture dots on the pawn's bottom surface 173 are magnified to an extent that only about four texture dots can fit on the bottom surface 173.

Figure 17H:
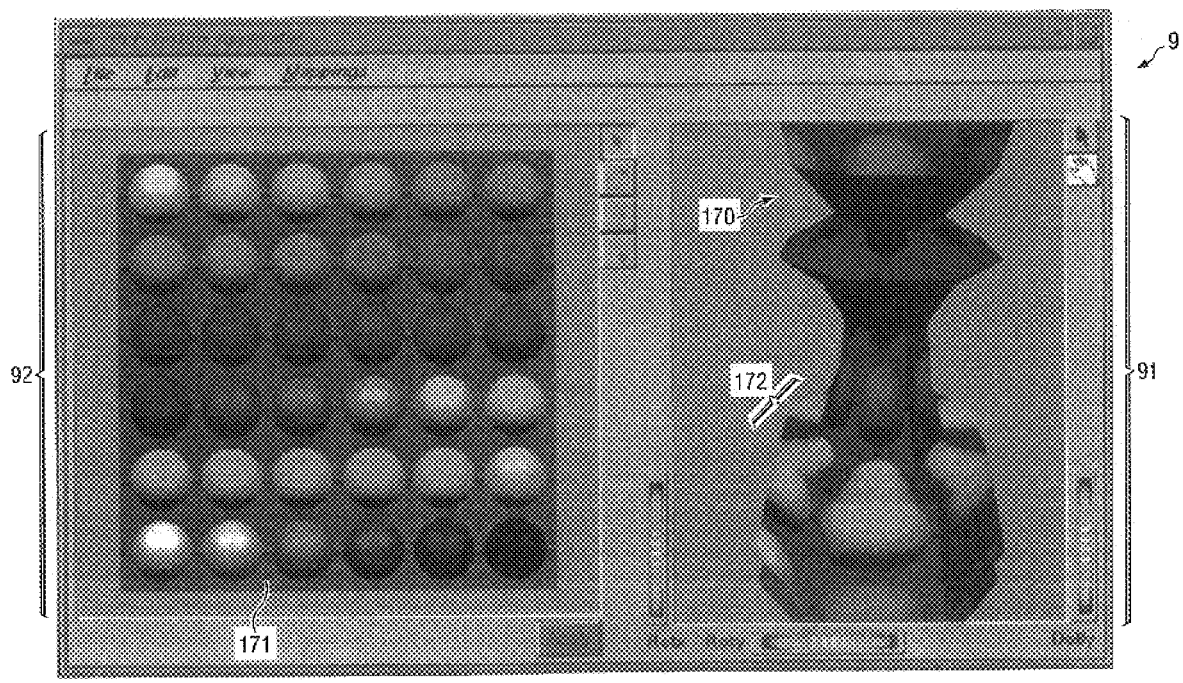
Figure 17I:
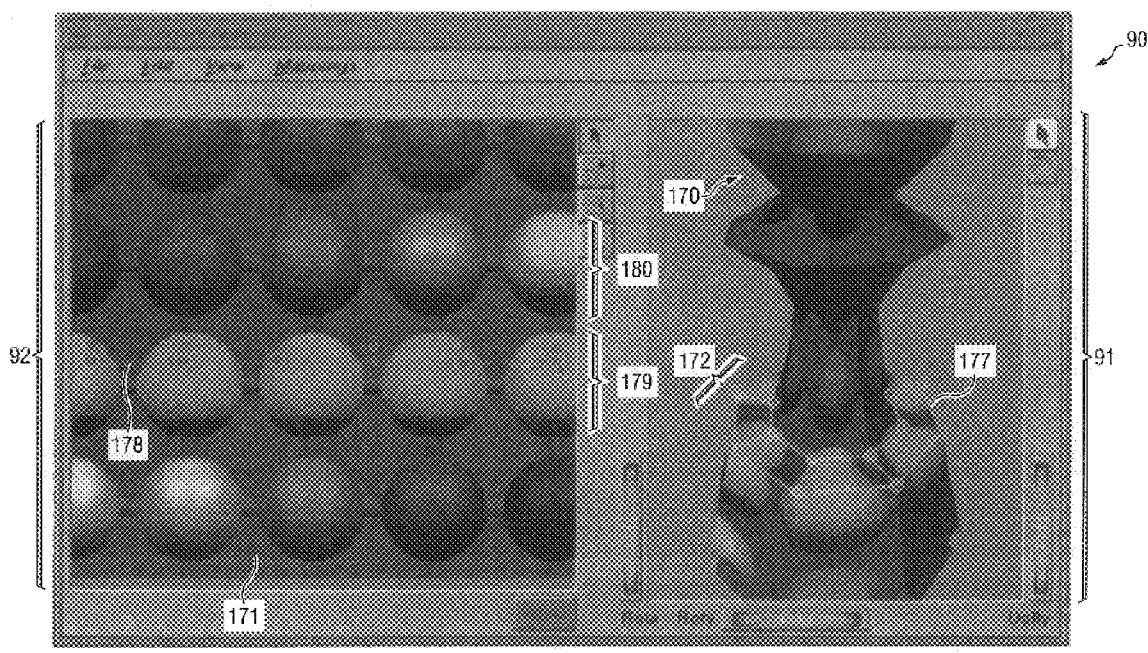

Next, the user has decided to correct some of the remaining texture smearing in region 172 and so has reoriented the display of the pawn 170 so that region 172 is readily visible as shown in FIG. 17H. To correct the texture smearing, the user has selected five contiguous object polygons 177 on the top surface of the pawn's base, as shown in FIG. 17I. The corresponding mappings into the texture space are represented by the 12 texture coordinates 178 displayed in the texture space region 92.

Because the 12 texture coordinates represent a relatively fine degree of detail which might be too small for some users to see, the Texture Applicator utility has zoomed in on (i.e., magnified) the texture space region 92 automatically so that the texture coordinates are readily visible to the user. In general, whenever a user undertakes an action that causes a different set of texture coordinates to be displayed in the texture space region 92, the Texture Applicator utility displays the texture coordinates as large as possible to fit within the texture space region 92. This auto-zoom feature can be disabled by a user if desired. The Texture Applicator utility also provides a full range of viewing capabilities which allow users to manually zoom in/out, dolly, rotate, etc. as desired.

Figure 17J:
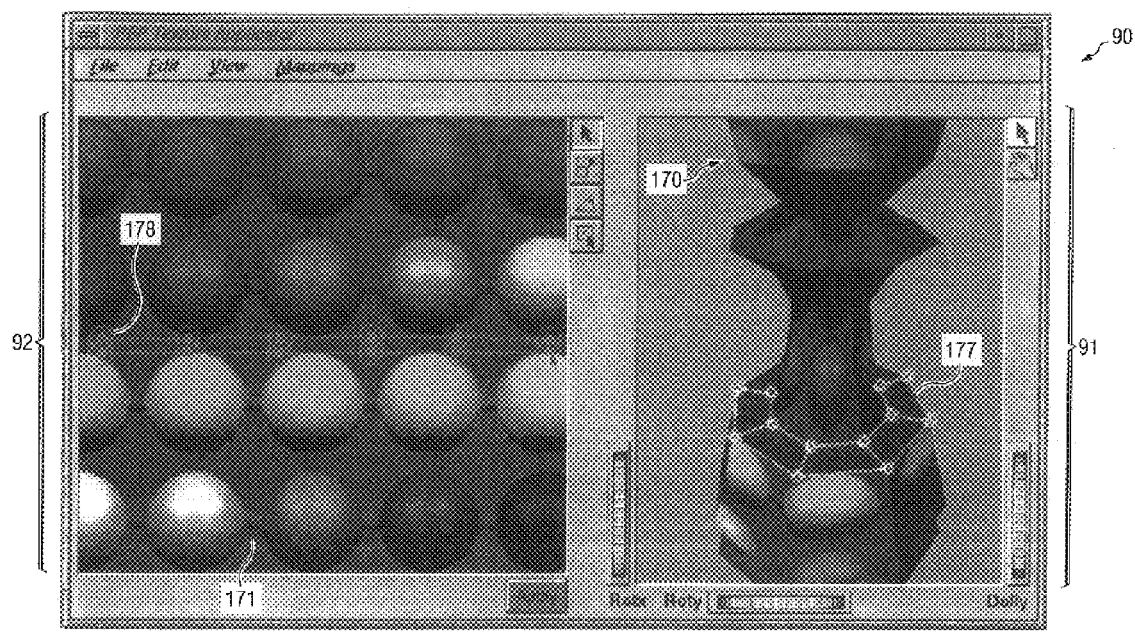

The texture smearing in this example is a result of mapping a relatively thin slice of a row of texture dots 179 across the relatively larger object polygons 177. As shown in FIG. 17J, the user has modified the texture mapping for the object polygons 177 by moving the 12 texture coordinates which form region 178 slightly upward to a location on the texture map 171 between two rows of texture dots (i.e., between row 179 and row 180)., As a result, the texture mapping no longer requires the row 179 of texture dots to be stretched across the object polygons 177 and the smearing effect has been reduced dramatically.

Other embodiments are within the scope of the claims. For example, instead of permitting users to modify a texture mapping by selectively adjusting positions of 3D object points within a separately displayed texture space region, users instead (or in addition) could modify a texture mapping by selectively adjusting positions of texture coordinates within the object space itself. For example, the object polygons could be displayed in one color or format and the corresponding texture coordinates could be displayed in a different style or format. In other words, the functionality of the two display regions 91 and 92 in FIG. 9A could be combined, interchanged or otherwise modified as desired according to a software developer's preferences.

The techniques and mechanisms described here were implemented on Silicon Graphics machines using the Open Inventor Toolkit, Motif, and OpenGL, and the C++ programming language. They are not limited to any particular hardware or software configuration, but rather they may find applicability in any computing environment in which graphical content may be created or manipulated. These techniques and mechanisms may be implemented in hardware or software, or a combination of the two. Preferably, implementation is achieved with computer programs executing on programmable computers that each include a processor, a storage medium readable by the processor (including volatile and non-volatile memory and/or storage elements), and suitable input and output devices. Program code is applied to data entered using the input device to perform the functions described and to generate output information. The output information is applied to one or more output devices. Each program is preferably implemented in a high level procedural or object oriented programming language to communicate with a computer system. However, the programs can be implemented in assembly or machine language, if desired. In any case, the language may be a compiled or interpreted language.

Each such computer program is preferably stored on a storage medium or device (e.g., CD-ROM, hard disk or magnetic diskette) that is readable by a general or special purpose programmable computer for configuring and operating the computer when the storage medium or device is read by the computer to perform the procedures described in this document. The system may also be considered to be implemented as a computer-readable storage medium, configured with a computer program, where the storage medium so configured causes a computer to operate in a specific and predefined manner.

What is claimed is:

1. A computer-implemented method of applying a texture to a 3D graphic object comprising a set of polygons, each polygon defined by coordinates residing in an object space, the method comprising:

providing in a texture space a graphic indication of a mapping between a 3D graphic object defined in the object space and a texture map defined in the texture space;

receiving input from a user specifying a manipulation of the graphic indication in the texture space; and modifying the mapping based on the specified manipulation of the graphic indication in the texture space, the graphic indication in the texture space being defined by texture coordinates, wherein each texture coordinate of the graphic indication in the texture space is capable of being manipulated independently from other texture coordinates of the graphic indication in the texture space to change the texture map.

2. The method of claim 1 further comprising rendering the 3D graphic object based on the modified mapping.

3. The method of claim 2 wherein the rendering occurs substantially simultaneously with the modification of the mapping.

4. The method of claim 2 wherein the modification of the mapping and the rendering of the 3D graphic object occur in real time.

5. The method of claim 1 further comprising, prior to the modification of the mapping, receiving through a graphic user interface input specifying the manipulation of the graphic indication.

6. The method of claim 5 wherein the input specifying the manipulation of the graphic indication is received from a user of a computer system.

7. The method of claim 1 further comprising presenting a first display region representative of the texture space and at least one other display region representative of the object space.

8. The method of claim 7 further comprising displaying the texture map in the first display region corresponding to the texture space and displaying the 3D graphic object in the other display region corresponding to the object space.

9. The method of claim 8 wherein providing the graphic indication of the mapping comprises displaying in the first display region a graphic element representative of the 3D graphic object at a location on the texture map corresponding to the mapping.

10. The method of claim 9 wherein manipulation of the graphic indication comprises performing a direct manipulation operation on the graphic element displayed in the first display region.

11. The method of claim 10 wherein performing the direct manipulation operation comprises translating the graphic element to a new location on the texture map.

12. The method of claim 10 wherein performing the direct manipulation operation comprises scaling the graphic element relative to the texture map.

13. The method of claim 12 further comprising receiving input from a user regarding a point about which the scaling is to be performed.

14. The method of claim 10 wherein performing the direct manipulation operation comprises rotating the graphic element relative to the texture map.

15. The method of claim 14 further comprising receiving input from a user regarding a point about which the rotating is to be performed.

16. The method of claim 10 further comprising providing visual feedback as the direct manipulation operation is being performed.

17. The method of claim 10 further comprising automatically repeating an instance of the texture map when the direct, manipulation operation causes the graphic element to extend beyond a boundary of the texture map.

18. The method of claim 1, wherein the modifying comprises altering only a portion of the mapping between the 3D graphic object and the texture map.

19. The method of claim 1 wherein the modification of the mapping comprises modifying a mapping between coordinates in an object space and coordinates in a texture space.

20. The method of claim 19 wherein the 3D graphic object comprises a plurality of polygons defined by coordinates, in the object space, and wherein a set of coordinates in the object space and a set of coordinates in the texture space are shared by at least two polygons in the object space.

21. The method of claim 20 wherein modification of the mapping for a polygon also modifies the mapping for an adjacent polygon.

22. The method of claim 19 wherein the 3D graphic object comprises a plurality of polygons defined by coordinates in the object space, and wherein modification of the mapping comprises altering the mapping for a polygon without altering the mapping for an adjacent polygon.

23. The method of claim 19 wherein the 3D graphic object comprises a plurality of polygons defined by coordinates in the object space, and wherein the method further comprises receiving input from a user specifying whether a set of coordinates in the object space and a set of coordinates in the texture space are to be shared between polygons.

24. The method of claim 19 wherein the 3D graphic object comprises a plurality of polygons defined by coordinates in the object space, and wherein the method further comprises receiving input from a user specifying one or more polygons for which the mapping is to be modified.

25. A computer-implemented method of applying a texture to a 3D graphic object, the method comprising:
providing a visual indication of a correlation between a 3D graphic object and a texture map;
receiving input from a user specifying a manipulation of the visual indication in a texture space; and
modifying the correlation by selectively applying a predetermined mapping function between the texture space and an object space to a portion of a 3D graphic object, based on the specified manipulation of the visual indication in the texture space,
wherein the modification further includes manipulating one or more texture coordinates in the texture space, to change the texture map.

26. The method of claim 25 wherein modifying the correlation comprises selectively applying one of a plurality of predetermined mapping functions between a texture space and an object space to different portions of the 3D graphic object.

27. The method of claim 25 further comprising receiving user input that specifies one of a plurality of predetermined mapping functions between a texture space and an object space to be applied to the portion of the 3D graphic object.

28. The method of claim 27 further comprising receiving further user input that specifies one of a plurality of different portions of the 3D graphic object to which the specified mapping function is to be applied.

29. The method of claim 25 further comprising:
presenting a graphical user interface to a user of a computer system; and
receiving input from the user designating a portion of the 3D graphic object and specifying at least one of a plurality of predetermined mapping functions to be applied to the designated portion of the 3D graphic object.

30. The method of claim 25 further comprising rendering the 3D graphic object based on the modified correlation.

31. A user interface for applying a texture to a 3D graphic object, the user interface comprising:
   an object region displaying a 3D graphic object formed of polygons, each polygon defined by coordinates residing in an object space;
   a texture region displaying a texture map; and
   a marker within the texture region defining a mapping between a polygon of the 3D graphic object and the texture map, the marker being defined by texture coordinates, and
   means for receiving, from a user of the user interface, input specifying a manipulation of the marker,
   wherein the manipulation of the marker within the texture map causes a corresponding change in the mapping between the polygon of the 3D graphic object and the texture map, wherein each texture coordinate is capable of being manipulated independently from other texture coordinates, to change the texture map.

32. The user interface of claim 31 wherein the marker comprises a graphic indication.

33. The user interface of claim 31 wherein the marker appears visually similar to a corresponding polygon forming the 3D-graphic object.

34. The user interface of claim 31 wherein movement of the marker within the texture map causes a corresponding change in the mapping between the polygon of the 3D graphic object, and the texture map.

35. The user interface of claim 31 further comprising a plurality of markers within the texture region, each of which defines a mapping, between a corresponding polygon of the 3D graphic object and the texture map.

36. The user interface of claim 35 wherein one of the markers can be moved independently of the other markers.

37. The user interface of claim 35 wherein movement of one of the markers affects the mappings of adjacent markers.

38. The user interface of claim 35 wherein movement of one of the markers does not affect the mappings of adjacent markers.

39. The user interface of claim 31 comprising an abstraction through which a user can move the marker within the texture region.

40. The user interface of claim 39 wherein the abstraction corresponds to translating movement.

41. The user interface of claim 39 wherein the abstraction corresponds to scaling movement.

42. The user interface of claim 39 wherein the abstraction corresponds to rotating movement.

43. Computer software for a 3D graphic content development system, the computer software residing on a computer-readable medium and comprising instructions for causing a computer to perform the following operations:
   provide in a texture space a graphic indication of a mapping between a 3D graphic object comprising a set of polygons, the graphic indication being defined by texture coordinates, each polygon defined by coordinates residing in an object space and a texture map defined in the texture space;
   receive input from a user of the 3D graphic content development system specifying a manipulation of the graphic indication in the texture space,
   wherein each texture coordinate is capable of being manipulated independently from other texture coordinates, to change the texture map;
   based on the specified manipulation of the graphic indication in the texture space, modify the mapping between the 3D graphic object and the texture map; and
   render a view of the 3D object using the modified mapping.

44. A 3D graphic content development system comprising:
   a graphical user interface for receiving input in the form of cursor manipulations from a user of the system;
   an interactive development environment for creating or modifying a 3D graphic object comprising a set of polygons each of which is represented by coordinates residing in an object space based on input received from the user through the graphical user interface;
   a texture applicator utility for applying a texture map defined in the texture space to the 3D graphic object by establishing a correlation between coordinates of the 3D graphic object and coordinates of the texture map; and
   a texture manipulator utility that displays a graphic representation of the correlation between coordinates of the 3D graphic object and corresponding texture coordinates of the texture map, wherein the texture manipulator utility includes means for the user to modify features of the graphic representation of the correlation,
   wherein each texture coordinate is capable of being manipulated independently of the other texture coordinates, to change the texture map.

45. The method of claim 1 in which the graphic indication in the texture space completely defines the mapping between the texture map and the 3D graphic object.

46. The computer software of claim 43 in which the graphic indication in the texture space completely defines the mapping between the texture map and the 3D graphic object.

47. The user interface of claim 31 in which the marker in the texture region completely defines the mapping between the polygon of the 3D graphic object and the texture map.

48. The system of claim 44 in which the graphic indication in the texture space completely defines the correlation between the texture map coordinates and the 3D graphic object coordinates.

49. A computer-implemented method of applying a texture to a 3D graphic object comprising a set of polygons, each polygon defined by coordinates residing in an object space, the method comprising:
   providing in a texture space a graphic indication of a mapping of coordinates of a polygon of the 3D graphic object defined in the object space to corresponding texture coordinates of a texture map defined in the texture space;
   receiving input from a user specifying a manipulation of the graphic indication in the texture space; and
   modifying the mapping based on the manipulation of the graphic indication of the texture coordinates in the texture space,
   wherein each texture coordinate in the texture space is capable of being manipulated independently from other texture coordinates, to change the texture map.

50. A user interface for applying a texture to a 3D graphic object, the user interface comprising:
   an object region displaying a 3D graphic object formed of polygons, each polygon defined by coordinates residing in an object space;
   a texture region displaying a texture map; and
   a marker within the texture region defining a mapping between coordinates of a polygon of the 3D graphic object and corresponding texture coordinates of the texture map; and means for receiving, from a user of the user interface, input specifying a manipulation of the marker, wherein the manipulation of the marker within the texture region causes a corresponding change in the mapping between the coordinates of the polygon of the 3D graphic object and the corresponding texture coordinates of the texture map, wherein each texture coordinate is capable of being manipulated independently from other texture coordinates, to change the texture map.

51. Computer software for a 3D graphic content development system, the computer software residing on a computer-readable medium and comprising instructions for causing a computer to perform the following operations:

provide in a texture space a graphic indication of a mapping between a 3D graphic object comprising a set of polygons, each polygon defined by coordinates residing in an object space and corresponding texture coordinates of a texture map defined in the texture space;

receive input from a user of the 3D graphic content development system specifying a manipulation of the graphic indication in the texture space, wherein each texture coordinate is capable of being manipulated independently from other texture coordinates, to change the texture map;

based on the specified manipulation of the graphic indication in the texture space, modify the mapping between the coordinates of the polygon of the 3D graphic object and the corresponding texture coordinates of the texture map; and render a view of the 3D object using the modified mapping.

* * * * *